US007001060B1

(12) United States Patent
Kimura

(10) Patent No.: US 7,001,060 B1
(45) Date of Patent: Feb. 21, 2006

(54) FRONT LIGHT HAVING A PLURALITY OF PRISM-SHAPED LENSES

(75) Inventor: Hajime Kimura, Kanagawa (JP)

(73) Assignee: Semiconductor Energy Laboratory Co., Ltd., (JP)

( * ) Notice: Subject to any disclaimer, the term of this patent is extended or adjusted under 35 U.S.C. 154(b) by 34 days.

(21) Appl. No.: 09/631,067

(22) Filed: Aug. 1, 2000

(30) Foreign Application Priority Data

Aug. 11, 1999 (JP) ................................ 11-227976

(51) Int. Cl.
*G02B 6/34* (2006.01)

(52) U.S. Cl. ...................... 362/620; 362/626; 362/603; 385/43; 349/63

(58) Field of Classification Search .................. 362/31, 362/26, 583, 560, 561, 330, 283, 620, 626, 362/339, 23, 600, 603, 606, 615, 617, 619, 362/623, 625, 317, 326, 551, 559; 385/39, 385/129, 15, 31, 36, 43; 349/63, 56, 61, 349/62, 64
See application file for complete search history.

(56) References Cited

U.S. PATENT DOCUMENTS 5,396,350 A * 3/1995 Beeson et al. ................ 349/62
5,555,109 A * 9/1996 Zimmerman et al. ......... 349/57
5,598,281 A * 1/1997 Zimmerman et al. .......... 349/5
5,684,365 A 11/1997 Tang et al. .............. 315/169.3
3,771,328 A 6/1998 Wortman et al. ........... 385/146
5,771,328 A 6/1998 Wortman et al. ........... 385/146
5,781,255 A 7/1998 Yamamoto et al. ........... 349/46
5,920,080 A 7/1999 Jones .......................... 257/40
5,932,892 A 8/1999 Hseuh et al. ................. 257/59
5,944,405 A 8/1999 Takeuchi et al.
5,990,629 A 11/1999 Yamada et al. .......... 315/169.3
6,011,529 A 1/2000 Ikeda .......................... 345/77
6,052,164 A 4/2000 Cobb, Jr. et al. ............. 349/64
6,091,384 A 7/2000 Kubota et al. ................ 345/76
6,104,041 A 8/2000 Hsueh et al. ................. 257/59
6,129,439 A 10/2000 Hou et al.
6,147,451 A 11/2000 Shibata et al. .............. 313/506

(Continued)

FOREIGN PATENT DOCUMENTS

EP 0 787 271 6/2001

(Continued)

OTHER PUBLICATIONS

TW 278142 English abstract.

(Continued)

*Primary Examiner*—Thomas M. Sember
*Assistant Examiner*—Ismael Negron
(74) *Attorney, Agent, or Firm*—Cook, Alex, McFarron, Manzo, Cummings & Mehler, Ltd.

(57) ABSTRACT

A front light includes: a light source, a light guide plate, and a plurality of prism-shaped lenses, each being in contact with a lower surface of the light guide plate. A cross-section of each of the prism-shaped lenses, in a plane perpendicular to the side surfaces thereof, has a shape of equally-sided trapezoid. An obtuse angle $\Phi_{out}$ of the equally-sided trapezoidal cross-section and a critical angle θc for the total reflection of the prism-shaped lenses satisfy the relationship of $90° < \Phi\ out \leqq 90° + \theta c$. When the light emitted from the light source enters the prism-shaped lens, the light is allowed to be reflected at a side surface defined by side-edges of the trapezoidal cross-section and thereafter exit through a lower surface. Thus, the light can illuminate pixel electrodes in a liquid crystal panel from a direction normal thereto.

27 Claims, 12 Drawing Sheets

U.S. PATENT DOCUMENTS

| | | | | |
|---|---|---|---|---|
| 6,246,179 | B1 | 6/2001 | Yamada | 315/169.3 |
| 6,320,633 | B1 | 11/2001 | Broer et al. | 349/113 |
| 6,476,550 | B1 | 11/2002 | Oda et al. | 313/504 |
| 6,508,564 | B1 | 1/2003 | Kuwabara et al. | 362/31 |
| 6,617,784 | B1 | 9/2003 | Abe et al. | 313/506 |
| 6,677,703 | B1 | 1/2004 | Ito et al. | 313/478 |
| 6,703,780 | B1 | 3/2004 | Shiang et al. | 313/504 |
| 6,777,871 | B1 | 8/2004 | Duggal et al. | 313/506 |
| 2001/0035713 | A1 | 11/2001 | Kimura | 313/501 |

FOREIGN PATENT DOCUMENTS

| | | |
|---|---|---|
| TW | 278142 | 6/1996 |
| TW | 289802 | 11/1996 |
| WO | WO 96/11358 | 4/1996 |

OTHER PUBLICATIONS

TW 289802 English abstract.

Tanaka et al, "Front Light Techniques which Expand a Range of Applications of Reflective Color Liquid Crystals," Liquid Crystal Display Seminar '98, *Material Technology,* text E-6 (4), 1998.

Funamoto, T. et al, "A Front-Lighting System Utilizing a Thin Light Guide," *Asia Display 98*, pp. 897-900, 1998.

Yamashita, "Reflective Color LCD Panels Appear at EDEX 98—Toward Full Scale Popularization," *Nikkei Electronics*, No. 717, pp. 41-46, Jun. 1, 1998.

Sato, "Sony has Represented its Relective Low-Temperature Poly-Si TFT-LCD," *Monthly FPD Intelligence*, pp. 22-23, Sep., 1998.

Cornelissen, H.J. et al, "Frontlights for Reflective LCDs based on Lightguides with Micro-Grooves," *SID 99 Digest*, pp. 912-915, 1999.

Tsutsui, T., et al, "Electroluminescence in Organic Thin Films," Photochemical Processes in Organized Molecular Systems, pp. 437-450, (1991).

Baldo, M.A. et al, "Highly Efficient Phosphorescent Emission from Organic Electroluminescent Devices," Nature, vol. 395, pp. 151-154, Sep. 10, (1998).

Baldo, M.A. et al, "Very High-Efficiency Green Organic Light-Emitting Devices Based on Electrophosphorescence," Applied Physics Letters, vol. 75, No. 1, pp. 4-6, Jul. 5, (1999).

Tsutsui, T. et al, "High Quantum Efficiency in Organic Light-Emitting Devices with Iridium-Complex as a Triplet Emissive Center," Japanese Journal of Applied Physics, vol. 38, part 2, No. 12B, pp. L 1502-L 1504, Dec. 15, (1999).

Tsutsui, T., et al, "Electroluminescence in Organic Thin Films," Photochemical Processes in Organized Molecular Systems, pp. 437-450, (1991).

Baldo, M.A. et al, "Highly Efficient Phosphorescent Emission from Organic Electroluminescent Devices," Nature, vol. 395, pp. 151-154, Sep. 10, (1998).

Baldo, M.A. et al, "Very High-Efficiency Green Organic Light-Emitting Devices Based on Electrophosphorescence," Applied Physics Letters, vol. 75, No. 1, pp. 4-6, Jul. 5, (1999).

Tsutsui, T. et al, "High Quantum Efficiency in Organic Light-Emitting Devices with Iridium-Complex as a Triplet Emissive Center," Japanese Journal of Applied Physics, vol. 38, part 2, No. 12B, pp. L 1502-L1504, Dec. 15, (1999).

* cited by examiner $\phi$ OUT ≒ 90

$\phi$OUT ≧ 90+(90-$\theta$c)

FRONT LIGHT HAVING A PLURALITY OF PRISM-SHAPED LENSES

BACKGROUND OF THE INVENTION

1. Field of the Invention

The present invention relates to a front light to be used for illuminating a reflective liquid crystal panel or the like, and an electronic device including such a front light.

2. Description of the Related Art

Recently, a larger number of portable devices are provided with reflective LCDs (liquid crystal display devices) as display devices for the following reasons. The reflective LCDs utilize external light for displaying an image and thus do not require a back light which is the most power consuming component in the display device. Thus, by using the reflective LCDs, a portable device driven by a battery can be used over a longer period of time. On the other hand, the reflective LCDs have a drawback in which a bright image cannot be displayed when sufficient external light is not available. In such a situation, the displayed image is not recognized well. In order to overcome the above drawback, a front light has been developed to illuminate a reflective liquid crystal panel when sufficient external light is not available.

FIGS. 13A and 13B show the construction of a prism-type front light as an example of the conventional front lights. This conventional prism-type front light includes a planar light guide plate 1 having a prism surface formed thereon, a light source 2 provided on a side surface of the light guide plate 1, and a reflector 3 for efficiently guiding light emitted from the light source 2 to the light guide plate 1. As the light source 2, a cold cathode tube, an LED or the like can be used.

Operations of the conventional prism-type front light will be described below. When the light source 2 is off (see FIG. 13A), external light 6 from the surroundings is incident on an upper surface 1*c* of the light guide plate 1 on which a prism is provided, and exits from a lower surface 1*d*. After reflected from pixel electrodes of a reflective liquid crystal panel 5, the light 6 passes through the light guide plate 1 to reach eyeballs of a user.

FIG. 13B shows operations of the front light when the light source 2 is on. As shown in FIG. 13B, light 8 emitted from the light source 2 is reflected from a lamp reflector 3 to be incident on a side surface 1*a* of the light guide plate 1. The light incident on the light guide plate 1 is reflected and refracted many times by the upper surface 1*c* and the lower surface 1*d* of the light guide plate 1 to be propagated toward the opposite side surface 1*b* thereof. The above propagation of the light is governed by Snell's law and Fresnel's law. Accordingly, when the light is incident on the interface between air and the upper surface 1*c* or the lower surface 1*d* of the light guide plate 1 at an angle smaller than the critical angle, the incident light exits from the lower surface 1*d* of the light guide plate 1 into air. The transmittance obtainable in the above situation can be calculated in accordance with Fresnel's law. The light exiting from the light guide plate 1 is then incident on the reflective liquid crystal panel 5 to function as illumination light which is effective for providing a display. The light incident on the liquid crystal panel 5 is modulated by the liquid crystal therein, and reflected from the pixel electrodes to be again incident on the lower surface 1*d* of the light guide plate 1. The light then exits from the upper surface 1*c* to reach eyeballs of a user.

The above-mentioned prism-type front light is described in many articles, for example, in the article entitled "Front light techniques which expand a range of applications of reflective color liquid crystals" in Liquid Crystal Display Seminar '98, Material Technology Text, E-6(4); the article entitled "Sony has presented its reflective low-temperature poly-Si TFT-LCD" in Monthly FPD Intelligence, (February 1998), p. 22; the article entitled "Reflective color LCD panels appear at EDEX'98—toward full-scale popularization" in Nikkei Electronics, No. 717 (Jun. 1, 1998), pp. 41–46; and the article entitled "Front lights for reflective LCDs based on light guides with micro-grooves" in 1999 SID Symposium Digest of Technical Papers, p. 912.

In the prism-type front light, the total reflection condition at the lower surface of the light guide plate is not satisfied by provision of the concave-and-convex configuration on the lower surface. Alternatively, it is possible to allow the light guide plate to be in contact with a material having a refractive index different from that of the light guide plate so that the total reflection condition is not satisfied there. The latter configuration is not classified into a front light, but used in a back light of ink dot type. On a lower surface of a light guide plate for an ink dot type back light, white ink is printed in dots on the lower surface of the light guide plate. Light incident on these dots are scattered there. The thus-scattered light is allowed to exit from the light guide plate since an incident angle thereof with respect to the upper surface of the light guide plate is smaller than the critical angle. The amount of the light exiting from the upper surface of the light guide plate is set to be uniform over the entire upper surface of the light guide plate by optimizing a size, a pitch, a density of the dots, or the other parameters.

However, the conventional prism-type front light has a drawback of low light utilization efficiency. Since the front light is typically combined with the reflective LCD, the front light requiring a large power consumption for its operation will have an adverse effect on the most advantageous feature of the reflective LCD, i.e., a low power consumption.

The reasons for the low light utilization efficiency can be described as follows. First, a portion of light incident on the prism surface is refracted as shown in FIG. 13B, resulting in light 11 exiting from the upper surface 1*c* of the light guide plate 1. The light 11 becomes a loss since it does not illuminate the liquid crystal panel, thereby leading to reduced light utilization efficiency. In order to compensate for the resultant reduction in luminance, power consumption of the light source has to be increased. In addition, the light 11 exiting from the upper surface 1*c* and traveling toward the user is not used for providing a display. Accordingly, recognition of the light 11 by the user will lead to a decreased contrast.

Secondly, the light entered into the light guide plate 1 cannot easily exit therefrom through the lower surface 1*d*, and therefore, is likely to be lost in the light guide plate 1. This in turn leads to reduced light utilization efficiency and lower luminance. More specifically, the light incident on the side surface 1*a* of the light guide plate 1 at a small incident angle experiences the smaller numbers of reflection and refraction at the upper and lower surfaces 1*c* and 1*d*, so that the light is likely to satisfy the total reflection condition. When the total reflection condition is satisfied, the light continues to be propagated in the light guide plate 1, while repeating reflections, to be finally attenuated therein.

As the third reason, the light emitted from the light source 2 is likely to exit from the light guide plate 1 toward the LCD at a large angle (i.e., an angle between the light and the normal to the lower surface 1*d* of the light guide plate 1 is likely to be large). This is because only the light incident on the lower surface 1*d* of the light guide plate 1 at an angle smaller than the critical angle for the total reflection can exit through the lower surface 1_d_.

While the light is propagated in the light guide plate 1, an incident angle to the lower surface 1_d_ becomes gradually smaller. When the incident angle to the lower surface 1_d_ becomes slightly smaller than the critical angle for the total reflection, the total reflection condition is not satisfied and the light exits from the lower surface 1_d_ of the light guide plate 1 into air. Accordingly, the exiting angle in this situation is close to 90°. Such light is not allowed to be incident on the reflective liquid crystal panel 5 at the right angle, thereby resulting in reduced light utilization efficiency.

A projection-type front light as shown in FIGS. 14A and 14B is intended to overcome the above-explained disadvantages of the prism-type front light. This projection-type front light includes a light guide plate 21, a light source 22, and a reflector 23. A lower surface 21_d_ of the light guide plate is formed to have projections with a rectangular cross-section.

When the front light is not on, as shown in FIG. 14A by an arrow, the external light incident on an upper surface 21_c_ of the light guide plate 21 passes through the light guide plate 21 to illuminate a reflective liquid crystal panel 25. The light reflected from the reflective liquid crystal panel 25 reaches eyeballs of a user.

When the front light is on, as shown in FIG. 14B by an arrow, the light emitted from the light source 22 is reflected from the reflector 23 to be incident on a side surface 21_a_ of the light guide plate 21. The incident light is propagated in the light guide plate 21 toward the opposite side surface 21_b_ thereof while being totally reflected between the upper surface 21_c_ and the lower surface 21_d_. Of the light being propagated within the light guide plate 21, portions incident on the upper surface 21_c_ are likely to satisfy the total reflection condition. Accordingly, little light can exit through the upper surface 21_c_. In addition, of the light incident on the lower surface 21_d_, portions incident on the bottom surfaces 24_a_ of the convex portions and the bottom portions 24_b_ of the concave portions always satisfy the total reflection condition. Accordingly, no light can exit from the light guide plate 21 through the bottom surfaces 24_a_ of the convex portions and the bottom portions 24_b_ of the concave portions.

On the other hand, the light incident on the side surfaces 24_c_ of the convex portions can pass therethrough since the incident angle thereof becomes smaller than the critical angle. As can be understood from the above, little light can exit through the upper surface 21_c_ of the light guide plate 21 in the projection-type front light, thus a loss of light becomes smaller as compared to the prism-type front light.

Furthermore, as shown in FIG. 15, a front light having projections 34 provided on a lower surface of a light guide plate 31 to have a trapezoidal cross-section. The front light in FIG. 15 can operate in the manner similar to the front light in FIGS. 14A and 14B, and furthermore, the light is allowed to pass through side surfaces 24_c_ of the convex portions by providing projections on the light guide plate 31 with a reverse-tapered cross-section. In FIG. 15, the same components as in FIG. 14 are designated by the same reference symbols.

The above-mentioned projection-type front light is described, for example, in the article entitled "A front-lighting system utilizing a thin light guide" in ASIA DISPLAY '98, p. 897. The advantage of the projection-type front light is to overcome the above-described first disadvantage of the prism-type front light. While the light emitted from the light source exits through the upper surface (i.e. through the side closer to the user) in the prism-type front light, only the light incident on the side surfaces 24_c_ of the projections can exit from the light guide plate in the projection-type front light, thereby resulting in decreased light loss and suppressed reduction in contrast.

It should be noted that as shown in FIGS. 14A and 14B, the light incident on the side surfaces 24_c_ of the projections is used for illuminating the reflective liquid crystal panel 25. However, the disadvantage relating to a large incident angle to the reflective liquid crystal panel 25, which is derived from the large exiting angle from the side surface 24_c_ of the convex portion, has not been still overcome. The large incident angle means that the light is incident on the pixel electrodes from the oblique direction, resulting in lowered light utilization efficiency. Furthermore, since only the light incident on the side surfaces 21_c_ of the convex portions can exit from the light guide plate 21, it is difficult for light to exit from the light guide plate 21. Accordingly, the light is still likely to be lost at the high probability during the propagation, and the disadvantage relating to this point has not been yet overcome.

SUMMARY OF THE INVENTION

An object of the present invention is to overcome the disadvantages of the projection-type front light as set forth above and provide a front light with high light utilization efficiency. The present invention is also intended to allow a reflective liquid crystal panel to be illuminated from a direction as normal thereto as possible by employing such a front light, and to suppress attenuation of light while being propagated in the light guide plate, thereby resulting in improved light utilization efficiency.

In order to overcome the above-described disadvantages, a front light of the present invention including a light source, a light guide plate, and a plurality of prism-shaped lenses each being in contact with a lower surface of the light guide plate, is characterized in that: a cross-section of each of the prism-shaped lenses, in a plane perpendicular to the side surfaces thereof, has a shape of equally-sided trapezoid; a plane defined by an upper base of the equally-sided trapezoidal cross-section of each of the prism-shaped lenses comes into contact with the lower surface of the light guide plate; and an obtuse angle $\Phi$ of the equally-sided trapezoidal cross-section and a critical angle $\theta$ for the total reflection of the prism-shaped lenses satisfy the relationship of $90° < \Phi \leqq 90° + \theta$.

In the above-described configuration, each of the prism-shaped lenses is an n-polygonal prism-shaped lens with a bottom surface of equally-sided trapezoid. Each of these prism-shaped lenses corresponds to projections provided in a conventional projection-type front light, and functions as an optical member for causing light propagated in the light guide plate to exit outwardly therefrom.

The upper base of the equally-sided trapezoid refers to a shorter one in a pair of opposing parallel edges, while the lower base refers to a longer one in the pair. Each of the prism-shaped lenses is in contact with the lower surface of the light guide plate at the side surface including the upper base thereof without any other material such as an adhesive layer being interposed. A reflective liquid crystal panel, a close-contact type optical sensor or the like is disposed so as to face the side surface defined by the lower base of the each of the prism-shaped lenses, and being illuminated with the front light.

When the light source is off, external light enters the light guide plate through the upper surface thereof to illuminate the reflective liquid crystal panel or the close-contact type optical sensor after passing through the light guide plate and a collimator sheet.

When the light source is on, light emitted from the light source is incident on the side surface of the light guide plate to be propagated in the light guide plate while being totally reflected at interfaces between the upper/lower surfaces of the light guide plate and air. During the propagation, portions of the light incident on the interface between the lower surface of the light guide plate and each of the prism-shaped lenses enter the prism-shaped lens.

It is desirable that a refractive index of each of the prism-shaped lenses is set to be equal to that of the light guide plate as close as possible. When the refractive index of each of the prism-shaped lenses is different from that of the light guide plate, light is allowed to be reflected or refracted at the interface between the light guide plate and each of the prism-shaped lenses, thereby resulting in that the interface becomes easily recognized by a user. On the other hand, with the refractive indexes being equal to each other, no reflecting component is generated in the light incident on the interface between the light guide plate and each of the prism-shaped lenses so that all of the incident light can enter the prism-shaped lenses. At least a refractive index of the collimator sheet is set to be smaller than that of the light guide plate. The easiest way to obtain the same refractive indexes is to form the prism-shaped lenses by the same material as the light guide plate.

The entered light is further incident on the interface between air and the side surface of the prism-shaped lens including the side-edges of the equally-sided trapezoidal cross-section. Although the projections in the conventional front lights illustrated in FIGS. 14A, 14B and 15 are formed in the tapered shape with respect to the lower surface of the light guide plate, the prism-shaped lenses in the present invention are formed in the reverse-tapered shape. Furthermore, in the cross-section of each of the prism-shaped lenses, an obtuse angle $\phi_{out}$ of the equally-sided trapezoidal cross-section and a critical angle $\theta_c$ for the total reflection of the prism-shaped lenses satisfy the relationship of $90° < \phi_{out} \leqq 90° + \theta_c$. Accordingly, almost all of the light incident on the interface between the side surface and air can be totally reflected, thereby resulting in satisfactory light utilization efficiency. The reflected light is incident on the plane defined by the lower base of the equally-sided trapezoidal cross-section to exit from the prism-shaped lens.

As one of the major features of the present invention, the light entered into each of the prism-shaped lenses is reflected before exiting therefrom. In the conventional projection-type front light, the light passing through the side surface is used to illuminate a liquid crystal panel, thereby inevitably resulting in a large incident angle onto the liquid crystal panel. On the other hand, in accordance with the present invention, the light is allowed to be reflected at the side surface of the prism-shaped lens to travel in a different direction before exiting from the lens. Thus, a smaller incident angle onto the reflective liquid crystal panel is realized, thereby resulting in enhanced light utilization efficiency.

Accordingly, in the present invention, the cross-section of each of the prism-shaped lenses is disposed in the reverse-tapered manner with respect to the lower surface of the fundamental light guide plate. More specifically, it is important that the cross-section has a shape with span widths becoming gradually smaller toward the end closer to the light guide plate, as compared to the light exiting side (i.e., positions closer to the liquid crystal panel). The shape of the cross-section is not limited to a trapezoidal shape. For example, the cross-section may have a shape of an axially-symmetric figure, that is enclosed with a pair of opposing parallel straight lines and a pair of opposing curved lines and is axially symmetric with respect to the straight line passing the middle points of the respective opposing parallel straight lines.

The above-described shape can be obtained by replacing the straight side-edges of the equally-sided trapezoid with curved side-edges. In such a cross-section, an angle defined between the normal at any one point on one of the curved lines and a straight line connecting the point on the curved line to a crossing point between the other curved line and the shorter edge is ideally equal to the critical angle for the total reflection of the prism-shaped lens. The angle is set to be at least in the range of ±3° with respect to the critical angle. With the above-mentioned configuration, the reflectance of light incident on the curved side surface of the prism-shaped lens can be increased.

The critical angle $\theta_c$ varies depending on the refractive index of the material that is in contact with the light guide plate. However, in usual situation, such a material that is in contact with the light guide plate is air. Accordingly, the obtuse angle $\phi_{out}$ of the equally-sided trapezoidal cross-section can be determined taking as reference the critical angle $\theta_c$ for the total reflection at the interface between the light guide plate and air.

Alternatively, the prism-shaped lenses can be replaced with rotational-body lenses having a shape of solid of revolution which can be obtained by rotating the above axially-symmetric figure around the symmetrical axis. The rotational-body lenses are disposed so as to have span widths becoming gradually smaller toward the end closer to the light guide plate, as compared to the light exiting side.

As set forth above, the prism-shaped lenses or the rotational-body lenses in the present invention are provided so as to have span widths that become gradually smaller toward the end closer to the light guide plate, as compared to the light exiting side (i.e., the end closer to the liquid crystal panel). Accordingly, it is difficult to form the prism-shaped lenses integrally with the light guide plate. Thus, in the present invention, the planar light guide plate is provided without being further processed, and a plurality of prism-shaped lenses or rotational-body lenses are separately prepared. These lenses are then disposed on this planar light guide plate so as to come into contact with the light guide plate.

BRIEF DESCRIPTION OF THE DRAWINGS

In the accompanying drawings:

FIGS. 1A to 1D are diagrams illustrating a configuration of the front light in accordance with Embodiment 1 of the present invention, in which FIG. 1A shows a cross-sectional view of the front light, FIG. 1B shows a perspective view of a collimator sheet, FIG. 1C shows a perspective view of each prism-shaped lens, and FIG. 1D shows a cross-sectional view of the prism-shaped lens in a plane perpendicular to the side surfaces;

FIGS. 3A to 3C are cross-sectional views of the prism-shaped lenses in accordance with the present invention, in which FIG. 3A shows the prism-shaped lenses 1061 with the obtuse angle $\phi_{out}$ of the equally-side trapezoidal cross-section satisfying the relationship of $\phi_{out}\approx 90°$, FIG. 3B shows the prism-shaped lenses 1062 with the obtuse angle $\phi_{out}$ of the equally-side trapezoidal cross-section satisfying the relationship of $\phi_{out} \geqq 90° + (90° - \theta_c)$, and FIG. 3C shows the prism-shaped lenses 1063 in accordance with the present invention, particularly intended to explain the relationship between the obtuse angle $\phi_{out}$ of the equally-side trapezoidal cross-section and the resulting image quality;

FIG. 6A shows a cross-sectional view of the front light, FIG. 6B shows a perspective view of a collimator sheet, FIG. 6C shows a perspective view of each prism-shaped lens, and FIG. 6D shows a cross-sectional view of the prism-shaped lens in a plane perpendicular to the side surfaces;

DETAILED DESCRIPTION OF THE PREFERRED EMBODIMENTS

Hereinbelow, embodiments of the present invention will be described with reference to the accompanying drawings.

Embodiment 1

A front light in the present embodiment utilizes prism-shaped lenses each having an equally-sided trapezoidal cross-section in a plane perpendicular to side surfaces.

FIG. 1 illustrates a configuration of the front light in the present embodiment. More specifically, FIG. 1A shows a cross-sectional view of the front light, FIG. 1B shows a perspective view of a collimator sheet, FIG. 1C shows a perspective view of each prism-shaped lens, and FIG. 1D shows a cross-sectional view of the prism-shaped lens in a plane perpendicular to the side surfaces.

Figure 1A:
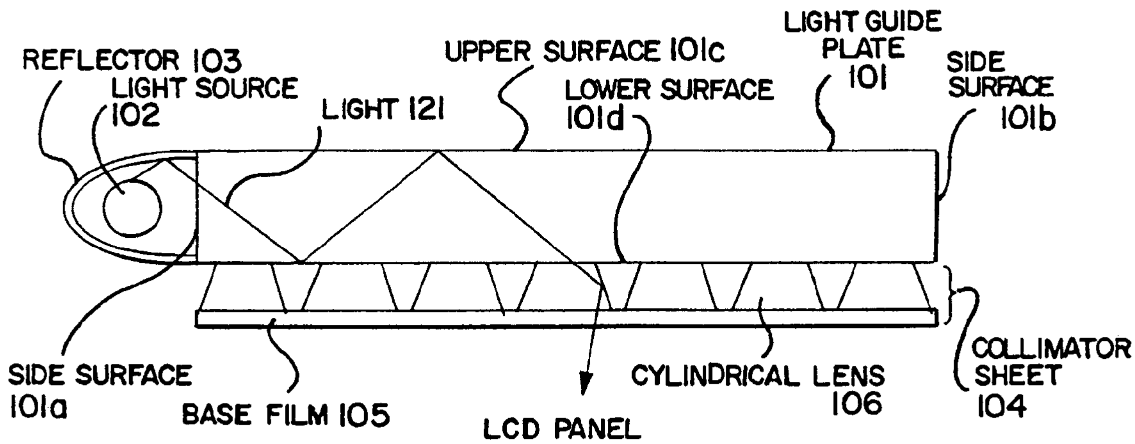
Figure 1B:
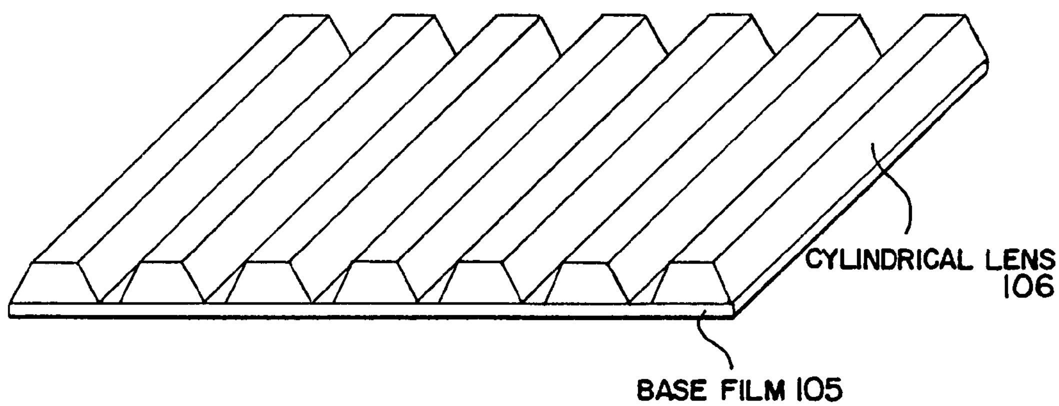

As shown in FIG. 1A, a light source 102 is disposed on a side surface 101*a* of a light guide plate 101, and a reflector 103 is further provided behind the light source 102. In addition, a collimator sheet 104 is provided so as to come into contact with a lower surface 101*d* of the light guide plate 101. For the purpose of clarification of the descriptions, an upper surface 101*c* of the light guide plate 101 refers to a surface facing a user, while the lower surface 101*d* refers to a surface opposite to the upper surface 101*c*.

The light guide plate 101 is a plate made of rectangular-shaped transparent material in the form of a rectangular parallelepiped with each of four side surfaces thereof being a rectangle in which the shorter edges are significantly shorter as compared to the longer edges. The material for the light guide plate 101 has the transmittance for visible lights (the whole light rays transmittance) of 80% or larger, more preferably of 85% or larger, and the refractive index of about 2½ or larger. With a refractive index in such a range, light incident on the side surface 101*a* at an incident angle of 90° can be refracted to be guided into the light guide plate 101. In the present embodiment, materials having the refractive index in the range of 1.4 to 1.7 will be selected.

As the transparent materials satisfying the above-mentioned conditions, inorganic glass (with the refractive index of 1.42 to 1.7 and the transmittance of 91% to 80%) such as quartz, borosilicate glass or the like, or a plastic material (resin material) can be used. As the plastic material, a methacrylic resin (typically, polymethyl methacrylate, known as acrylic, having the refractive index of 1.49 and the transmittance of 92% to 93%), polycarbonate (having the refractive index of 1.59 and the transmittance of 88% to 90%), polyarylate (having the refractive index of 1.61 and the transmittance of 85%), poly-4-methylpentene-1 (having the refractive index of 1.46 and the transmittance of 90%), an AS resin [acrylotrile styrene polymer] (having the refractive index of 1.57 and the transmittance of 90%), an MS resin [methylmethacrylate styrene polymer] (having the refractive index of 1.56 and the transmittance of 90%), or a material obtained by mixing two or more of the above-listed resins, can be used.

As the light source 102, a cold cathode ray tube or an LED can be used. The light source 102 is disposed along the side surface 101*a* of the light guide plate 101. Furthermore, two of the light sources 102 may be provided to face each other with the light guide plate 101 interposed therebetween by providing another light source 102 and another reflector 103 on the opposite side surface 101*b* of the light guide plate 101.

Figure 1C:
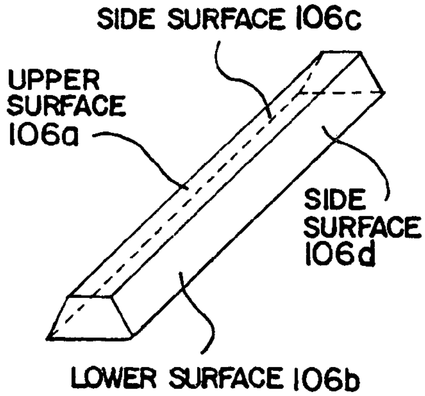
Figure 1D:
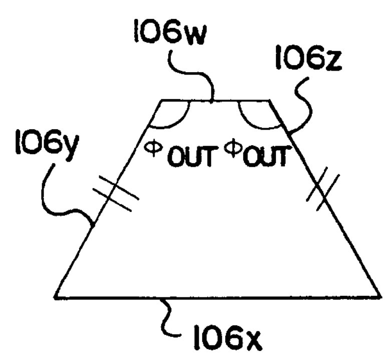

The collimator sheet 104 includes abase film 105 and a plurality of prism-shaped lenses 106 disposed in parallel on the base film 105. As shown in FIGS. 1C and 1D, these prism-shaped lenses are n-polygonal prism-shaped lenses each having an equally-sided trapezoidal cross-section. For the clarification of the descriptions, a side surface including an upper base 106*w* of the equally-sided trapezoid is referred to as an upper surface 106*a*, while another side surface including a lower base 106*x* is referred to as a lower surface 106*b*. The other side surfaces including side-edges 106*y* and 106*z*, respectively, are referred to as side surfaces 106*c* and 106*d*, respectively.

In the collimator sheet 104, each of the prism-shaped lenses 106 is disposed so that the lower surface 106*b* thereof is brought into contact with the base film 105. In addition, the collimator sheet 104 is disposed so that the upper surface 106*a* thereof comes into close contact with the lower surface 110*d* of the light guide plate 101. Although it is not necessary to closely contact the base film 105 and a reflective liquid crystal panel, it is critical that each of the prism-shaped lenses 106 and the light guide plate 101 are in close contact with each other without any other materials interposed therebetween.

As a material for the base film 105, a resin film having an 80% or higher transmittance for visible lights, for example, a PET resin or the like, is preferably used. As a material for the prism-shaped lenses 106, a material having an 80% or higher transmittance for visible lights (whole light rays transmittance), more preferably of 85% or higher, and the refractive index in the range of 1.4 to 1.7 will be selected, as in the case of the material for the light guide plate 101. For example, the same material as used for the above-mentioned light guide plate 101 can be used for the prism-shaped lenses 106. In terms of processibility or cost, a plastic material is suitable. In addition, the material for the prism-shaped lenses 106 is selected so as to have the refractive index equal to that of the light guide plate 101 in order to prevent light from being reflected or refracted at the interface between the prism-shaped lenses 106 and the light guide plate 101.

In the present embodiment, polymethyl methacrylate (acrylic) having the refractive index of 1.49 is used for both the prism-shaped lenses 106 and the light guide plate 101. As the material for the base film 105, a PET resin is selected.

Hereinbelow, with reference to FIG. 2, functions of the collimator sheet 105 and the shape of the prism-shaped lenses 106 will be described.

When the light source 102 is not on, an external light is allowed to enter the light guide plate 101 through the upper surface 101*c* thereof. The entered light passes through the light guide plate 101 and the collimator sheet 104, reflected at a reflective LCD, and again passes through the collimator sheet 104 and the light guide plate 101 to reach eyeballs of a user.

When the light source 102 is on, the light emitted from the light source 102 is reflected by the reflector 103 to enter the light guide plate 101 through the side surface 110*a* thereof. The entered light is propagated in the light guide plate 101 while being totally reflected at the upper surface 101*c* and the lower surface 101*d*.

An incident angle $\theta_1$ defined when the light entered into the light guide plate 101 through the upper surface 110*a* from air is incident on the lower surface 110*d* (or on the upper surface 101*c*) of the light guide plate 101 satisfies the relationship of $90°-\theta_c \leqq \theta_1 \leqq 90°$ in view of Snell's law and the geometrical shape of the light guide plate 101 (i.e., its cross-section is in a rectangle). $\theta_c$ represents the critical angle of the total reflection of the light guide plate 101 with respect to air. The light incident on the side surface 101*a* of the light guide plate 101 at the incident angle of 90° is further incident on the upper surface 101*c* (or on the lower surface 101*d*) of the light guide plate 101 at the incident angle of $90°-\theta_c$, while the light incident on the side surface 110*a* at the incident angle of 0° is further incident on the upper surface 101*c* (or on the lower surface 101*d*) at the incident angle of 90°. Thus, the above-mentioned range to be satisfied by the incident angle $\theta_1$ can be obtained.

When the incident angle $\theta_1$ is larger than the critical angle $\theta_c$, a light 121 is totally reflected at the interface between air and the light guide plate 101. Since the refractive index of the light guide plate 101 is larger than 2½ (i.e., larger than $\sin^{-1}45°$) the critical angle $\theta_c$ becomes smaller than 45°. Since the incident angle $\theta_1$ is larger than the critical angle $\theta_c$, the light incident on the interface between the lower surface 101*d* (or the upper surface 101*c*) and air is totally reflected. The reflection angle in this case is equal to the incident angle $\theta_1$. Thus, the light emitted from the light source 102 is propagated in the light guide plate 101 while repeating the total reflection at the interfaces with air to travel from the side surface 101*a* to the opposite side surface 101*b*.

In the present embodiment, the light guide plate 101 is made of an acrylic resin (having the refractive index of 1.49), and therefore, the critical angle $\theta_c$ is about 42°. Accordingly, the incident angle $\theta_1$ of the light incident on the lower surface 101*d* or the upper surface 101*c* of the light guide plate 101 is required to satisfy the relationship of $48°<\theta_1 \leqq 90°$.

Figure 2:
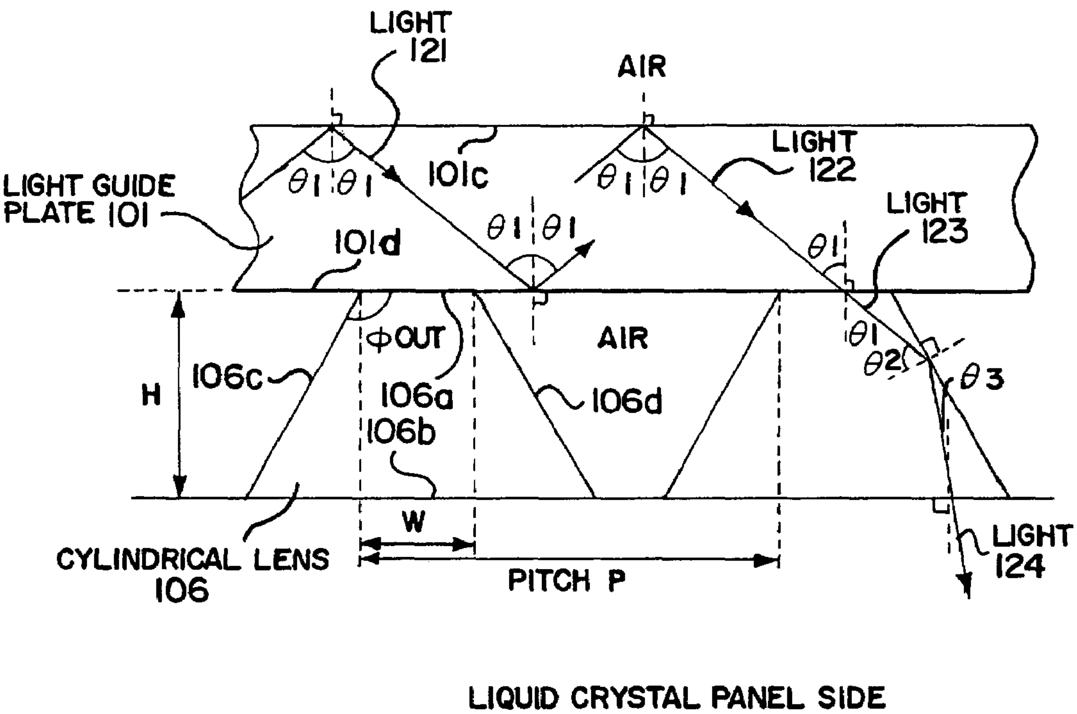
FIG. 2 illustrates a cross-sectional view of the prism-shaped lenses in accordance with the present invention.

As shown in FIG. 2, the light 121 incident on the interface with air at the lower surface 101*d* of the light guide plate 101 is totally reflected there, while a light 122 incident on the contact surface to the prism-shaped lenses 106 is allowed to further enter the prism-shaped lenses 106. Since the refractive index of the prism-shaped lenses 106 is equal to that of the light guide plate 101, the refraction angle of the light 122 is equal to the incident angle $\theta_1$. Thus, the light 122 is allowed to enter the prism-shaped lenses 106 without being refracted at the interface.

A light 123 thus entered into the prism-shaped lenses 106 is then incident on the side surface 106*d* thereof at the incident angle $\theta_2$ and reflected therefrom. This reflected light is then incident on the lower surface 106*b* at the incident angle $\theta_3$. It should be noted that the angle $\theta_2$ is defined as an angle between the light ray and the normal to the side surface 106*d*, while the angle $\theta_3$ is defined as an angle between the light ray and the normal to the lower surface 106*b*.

Due to the reflection at the side surface 106*d*, the incident angle $\theta_3$ is smaller than the critical angle for the total reflection of the prism-shaped lenses 106 with respect to air. Thus, a light 124 incident on the lower surface 106*b* of the prism-shaped lenses 106 can exit to the outside. The light thus exiting through the lower surface 106*d* of the prism-shaped lenses 106 illuminates the reflective liquid crystal panel. This light is incident thereon at a certain incident angle and reflected at pixel electrodes of the reflective LCD. Thereafter, the light passes through the collimator sheet 104 and the light guide plate 101 to reach eyeballs of an observer.

In the present embodiment, the light reflected at the side surface 106*d* (106*c*) of the prism-shaped lenses 106 is used to illuminate the liquid crystal panel, thereby resulting in a reduced incident angle onto the liquid crystal panel. As a result, the light component vertically illuminating the liquid crystal panel becomes large, and the light can be efficiently utilized.

As described above, in order to guide the light reflected at the side surface 106*d* (106*c*) toward the liquid crystal panel at a higher efficiency, it is preferred that the reflectances at the side surfaces 106*c* and 106*d* of the prism-shaped lenses 106 are set at as high a value as possible. Ideally, the light is totally reflected at the side surfaces 106*c* and 106*d*. Hereinbelow, suitable conditions for realizing the total reflection there will be described.

As set forth above, the incident angle (as well as the refraction angle) $\theta_1$ at the interface between the light guide plate 101 and the prism-shaped lenses 106 (upper surface 106*a* of the prism-shaped lenses 106) is in the range of $90°-\theta_c \leqq \theta_1 \leqq 90°$. On the other hand, when the incident angle $\theta_2$ of the light with respect to the side surface 106*c* (106*d*) of the prism-shaped lenses 106 is equal to or larger than the critical angle for the total reflection of the prism-shaped lenses 106 with respect to air, the light is allowed to be totally reflected at the side surface 106*c* (106*d*). Since the prism-shaped lenses 106 and the light guide plate 101 are made of the same material, the critical angle for the total reflection of the prism-shaped lenses 106 is equal to the critical angle $\theta_c$ of the light guide plate 101. Accordingly, in order to allow the light to be totally reflected, the relationship of $\theta_c<\theta_2\leqq 90°$ should be satisfied.

With an obtuse angle $\phi_{out}$ of the equally-sided trapezoidal cross-section of the each of the prism-shaped lenses 106, the angle $\theta_2$ will satisfy the following relationship in view of geographical theory:

$$90°+\theta_2=\theta_{out}+(90°-\theta_1)$$

and therefore, $$\theta_2=\theta_{out}-\theta_1$$

will be derived.

Figure 3A:
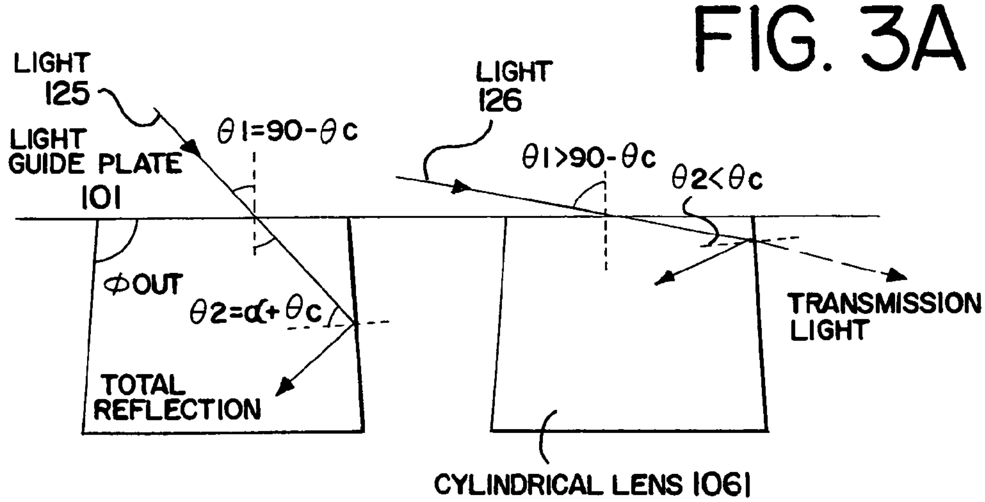

Assuming that the obtuse angle $\phi_{out}$ of the equally-side trapezoidal cross-section satisfies $\phi_{out}\approx 90°$, i.e., $\phi_{out}=90°+\alpha$ ($|\alpha|\approx 0°$, as shown in FIG. 3A. In this case, a light 125 incident on the upper surface 106*a* of the prism-shaped lenses 106 at the incident angle $\theta_1=90°-\theta_c$ is totally reflected at the side surface 106*d* (106*c*) since the incident angle of the light 125 at the side surface 106*d* (106*c*) becomes $\theta_2=\alpha+\theta_c$. On the other hand, a light 126 incident on the upper surface 106*a* at the incident angle $\theta_1>90°-\theta_c$ has the reflection angle $\theta_2<\theta_c$ at the side surface 106*d* (106*c*). Accordingly, the component passing through the side surface 106*d* (106*c*) is generated as indicated by broken lines, resulting in reduced light utilization efficiency.

Next, assuming that the obtuse angle $\phi_{out}$ of the equally-side trapezoidal cross-section satisfies $\phi_{out}=90°+\theta_c$. When the incident angle $\theta_1$ onto the upper surface 106*a* satisfies the relationship of $\theta_1=90°-\theta_c$, the incident angle $\theta_2$ onto the side surfaces 106*c* and 106*d* satisfies $\theta_2=2\theta_c$, and therefore, the light is totally reflected at the side surfaces 106*c* and 106*d* of the prism-shaped lenses 106. With $\theta_1=90°$, the light is totally reflected since the incident angle $\theta_2$ satisfies $\theta_2=\theta_c$. In other words, with $\phi_{out}=90°+\theta_c$, the light incident on the side surfaces 106*c* and 106*d* of the prism-shaped lenses 106 are allowed to be totally reflected.

Figure 3B:
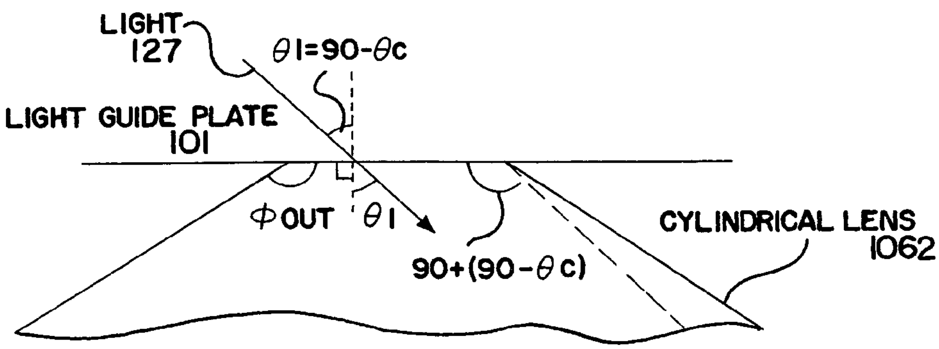

Finally, assuming $\phi_{out}\geqq 90°+(90°-\theta_c)$ as shown in FIG. 3B. With $\phi_{out}=90°+(90°-\theta_c)$, the light path of a light 127 with an incident angle $\theta_1=90°-\theta_c$ is parallel to the side-edges of the equally-sided trapezoidal cross-section, as shown by a one-dotted broken line. Accordingly, with $\phi_{out}\geqq 90°+(90°-\theta_c)$, the light incident on the upper surface 106*a* at the incident angle $\theta_1$ which satisfies the relationship of $90°-\theta_c\leqq\theta_1<\phi_{out}$ is not reflected at the side surfaces 106*c* and 106*d* of the prism-shaped lenses 106 but exits through the lower surface 106*b*.

As can be understood from the above, in order to allow the light to be reflected at the side surfaces 106*c* and 106*d* of the prism-shaped lenses 106, the relationship of $90°<\theta_{out}<90°+(90°-\theta_c)$, more preferably $90°<\phi_{out}\leqq 90°+\theta_c$ (where $\theta_c<45°$), is required to be satisfied. In the present embodiment, since $\theta_c$ satisfies $\theta_c\approx 42°$, the relationship of $90°<\phi_{out}\leqq 90°+48°$, more preferably $90°<\phi_{out}\leqq 90°+42°$, will be satisfied.

Figure 3C:
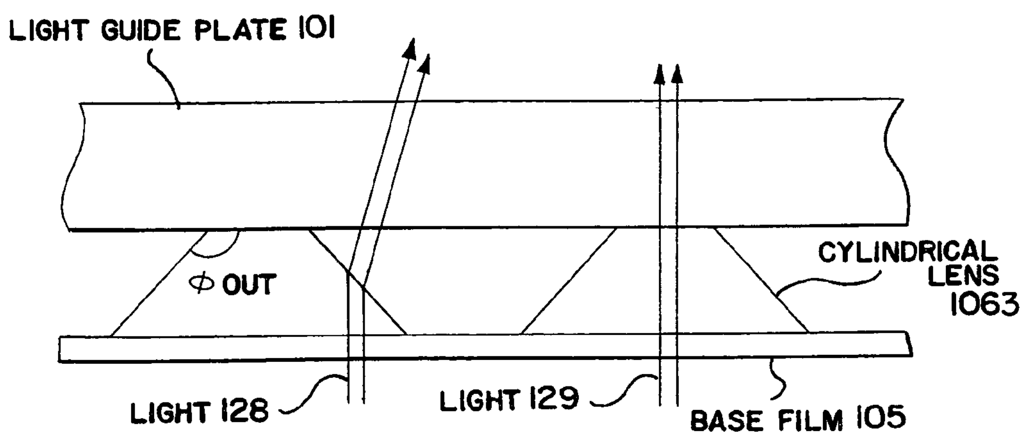

The smaller obtuse angle $\phi_{out}$ of the equally-sided trapezoidal cross-section is preferable because the larger $\phi_{out}$ is, the worse the image quality deteriorates. As shown in FIG. 3C, the light reflected at the reflective liquid crystal panel is incident on the collimator sheet 104. For simplifying the illustration, in FIG. 3C, the refraction between the collimator sheet 104 and the base film 105 is neglected and the incident angle at the lower surface 106*b* of the prism-shaped lenses 106 is set to be 0°. Of the light entered into the prism-shaped lenses 106, a light 128 passing through the side surfaces 106*c* and 106*d* enter the light guide plate 101 after being refracted at the side surfaces 106*c* and 106*d* due to a difference in refractive indexes between the prism-shaped lenses 106 and air. This causes the image quality to deteriorate. On the other hand, a light 129 passing through the upper surface 106*a* is allowed to enter the light guide plate 101 without being refracted since there is no difference in refractive indexes between the prism-shaped lenses 106 and the light guide plate 101, thereby resulting in no deterioration in the image quality. As can be understood from the above descriptions, the image quality is more likely to deteriorate with a larger obtuse angle $\phi_{out}$.

Moreover, in view of the fact that the prism-shaped lenses 106 are fabricated with molds, the obtuse angle $\phi_{out}$ of the equally-side trapezoidal cross-section is preferably set to be 93° or larger in order to allow the fabricated prism-shaped lenses 106 to be easily ejected out of the molds.

Hereinbelow, the suitable size of the prism-shaped lenses will be described with varying the conditions to be satisfied by the obtuse angle $\phi_{out}$ of the equally-side trapezoidal cross-section.

Figure 4:
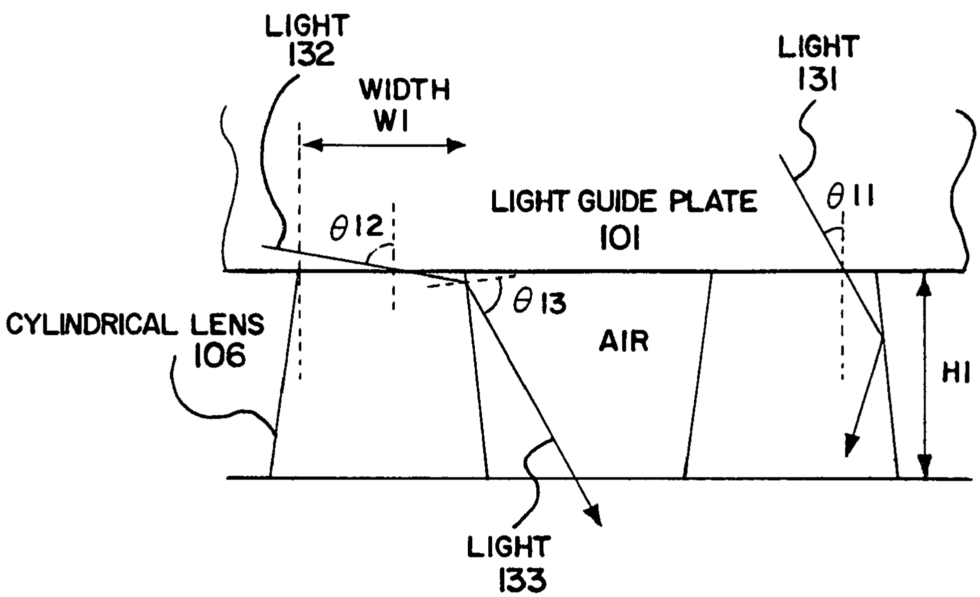
FIG. 4 illustrates a cross-sectional view of the prism-shaped lenses in accordance with the present invention when the obtuse angle $\phi_{out}$ of the equally-side trapezoidal cross-section is close to the right angle.

FIG. 4 illustrates a cross-sectional view of the prism-shaped lenses when the obtuse angle $\phi_{out}$ of the equally-side trapezoidal cross-section is close to the right angle. More specifically, FIG. 4 is intended to show the relationship between a width W1 and a height H1 of the prism-shaped lenses 106 with $\phi_{out}=95°$. First of all, in order to allow the incident light to be reflected at the side surface of the prism-shaped lenses, even a light 131 with a small incident angle $\theta_{11}$ has to be incident on the side surface. This can be realized by satisfying the relationship of $H1\geqq W1/\tan\theta_{11}=W1/1.11$. Here, the angle $\theta_{11}$ satisfies $\theta_{11}=48°$.

Then, considering the case of a light 132 entered with a large incident angle $\theta_{12}$. In this case, the obtuse angle $\phi_{out}$ is smaller than $90°+\theta_c$. Accordingly, certain portions of the light 132 with a large incident angle $\theta_{12}$ pass through the prism-shaped lenses 106. In addition, when the thus-passed light enters the adjacent prism-shaped lens 106, the light may return to the light guide plate 101 after repeating reflection and refraction. The light may further exit from the light guide plate 101 toward a user. In order to avoid such undesirable situations, it is desirable to prevent the light 133 that has passed through the side surfaces from entering the adjacent prism-shaped lens 106.

For that purpose, the relationship of $T1\geqq H1\times\tan(\phi_{out}-\theta_{13})$ is required to be satisfied, where $\theta_{13}$ represents the refraction angle of the light 132 at the side surface and satisfies the relationship of $1\times\sin\theta_{13}=1.49\times\sin(\phi_{out}-\theta_{12})$. However, in the case of $\theta_{12}=90°$, the refraction angle $\theta_{13}$ becomes close to 0° with $\phi_{out}$ being close to 90°, and therefore, the interval T1 becomes too large in accordance with the above-mentioned in equality relationship. Thus, in an actual situation, the interval T1 is only required to be as large as possible.

Figure 5:
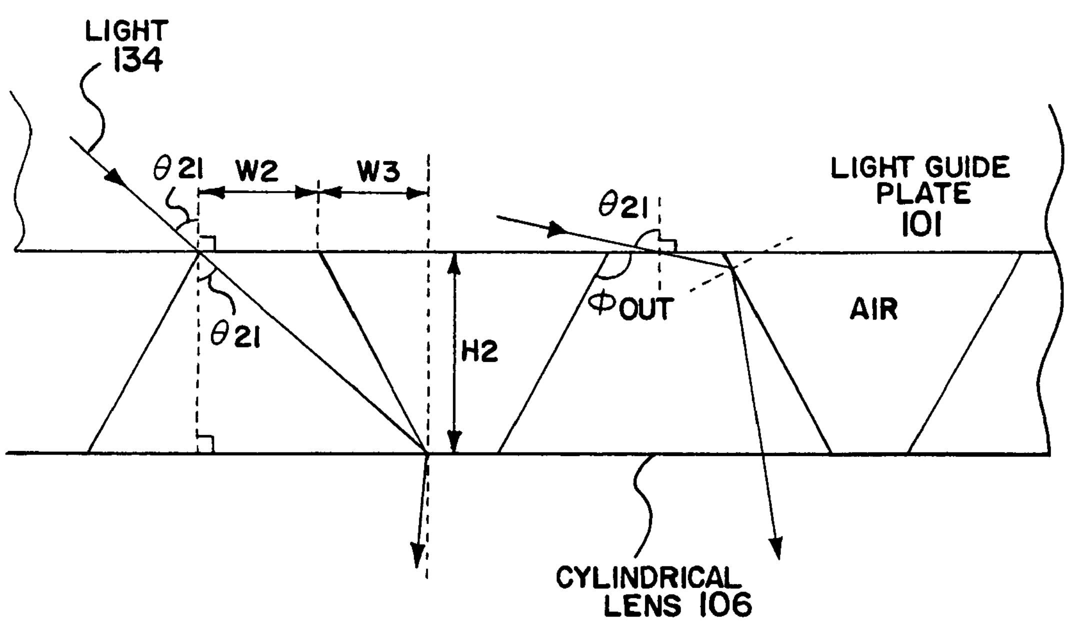
FIG. 5 illustrates an enlarged cross-sectional view of the prism-shaped lenses in accordance with the present invention, where the obtuse angle $\phi_{out}$ is large.

Then, with reference to the case FIG. 5, the case where the obtuse angle $\phi_{out}$ is large, $\phi_{out}=132°(90+\theta_c$, will be described below. FIG. 5 illustrates an enlarged cross-sectional view of the prism-shaped lenses 106. Since the angle $\phi_{out}$ is large with $\phi_{out}=132°$, almost all of the light incident on the side surface of the prism-shaped lenses is reflected therefrom. Thus, it is not necessary that the adjacent prism-shaped lenses are disposed apart with certain distances therebetween. Nevertheless, the adjacent prism-shaped lenses may be disposed apart with certain distances therebetween.

A height H2 of the prism-shaped lenses 106 will be then described. When the height H2 is low, then some of light is not incident on the side surface of the prism-shaped lenses 106, and directly reaches the lower surface 106*b* to be further incident onto the base film 105. However, the light is totally reflected at the interface between the base film 105 and air since the total reflection condition is satisfied there. No disadvantage will be induced if the thus-reflected light returns to the light guide plate 101. However, if the reflected light enters the prism-shaped lenses 106 to be guided in different directions through the reflection and refraction at the side surfaces of the lenses 106, the light may exit from the light guide plate 101 through the upper surface thereof toward an observer. In order to avoid such an undesirable situation, it is necessary that even the light incident onto the prism-shaped lenses 106 with a small incident angle $\theta_{21}$ must to be incident on the side surfaces 106*c* and 106*d* of the prism-shaped lenses 106.

For that purpose, as shown in FIG. 5, the path of light 134 with an incident angle $\theta_{21}=48°$ is required to coincide with a diagonal line of the equally-sided trapezoidal cross-section. This can be realized when the following relationship $H2=(W2+W3)\times\tan(90°-\theta_{21})$ is satisfied, where $W3=H2/\tan(180°-\phi_{OUT})$. Substituting $\theta_{21}=48°$ and $\phi_{out}=132°$ and eliminating W3 provide H2=4.76×W2. Thus, by determining H2, the optimal value for W2 can be obtained.

Furthermore, with respect to the prism-shaped lenses 106, a width W of the upper surface 106*a*, a height H (a distance between the upper surface 106*a* and the lower surface 106*b*), and a pitch P (the sum of the width and the interval) also depend on other parameters such as a thickness or size (the longitudinal size multiplied by the traverse size) of the light guide plate 101. In addition, production margins of the prism-shaped lenses 106 has to be also taken into consideration. Preferably, the width W and the height H are set on the order of several tens of micrometers, for example, in the range of 10 to 50 μm. With a smaller pitch P, luminance values will decrease at points farther from the light source 102. Thus, the pitch P is preferably set on the order of several hundreds of micrometers, for example, in the range of 100 to 500 μm.

Embodiment 2

In the present embodiment, one modified mode of the prism-shaped lenses in Embodiment 1 will be described. In Embodiment 1, each of the prism-shaped lenses has an equally-sided trapezoidal cross-section. However, as shown in FIGS. 3A to 3C, the light incident on the side surfaces 106*c* and 106*d* may transmit therethrough depending on the obtuse angle $\phi_{out}$ of the equally-side trapezoidal cross-section, thereby resulting in reduced light utilization efficiency. On the other hand, the lenses in the present embodiment are intended to overcome such disadvantages of the prism-shaped lenses having the trapezoidal cross-section, and allow the light incident on the upper surface of the prism-shaped lenses to stop its travel at the side surfaces thereof and be totally reflected therefrom.

FIG. 6 illustrates a configuration of the front light in the present embodiment. More specifically, FIG. 6A shows a cross-sectional view of the front light, FIG. 6B shows a perspective view of a collimator sheet, FIG. 6C shows a perspective view of each prism-shaped lens, and FIG. 6D shows a cross-sectional view of the prism-shaped lens in a plane perpendicular to the side surfaces.

Figure 6A:
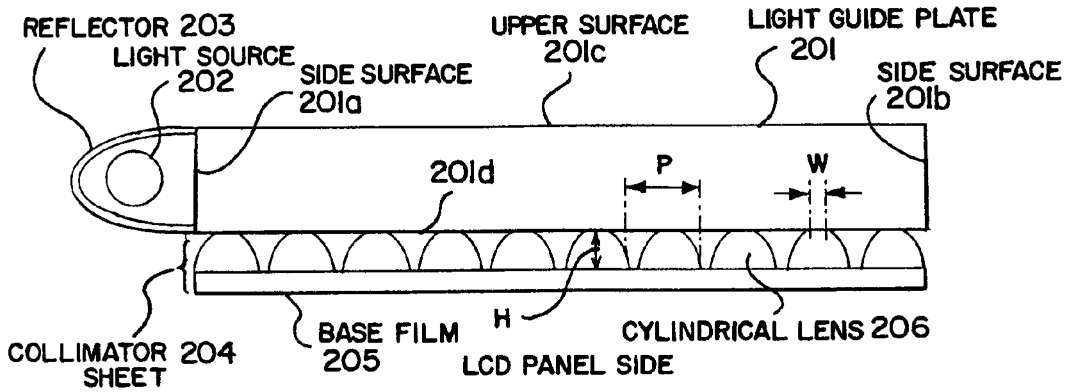
FIGS. 6A–6D illustrate a configuration of the front light in accordance with Embodiment 2 of the present invention, and more specifically.
Figure 6B:
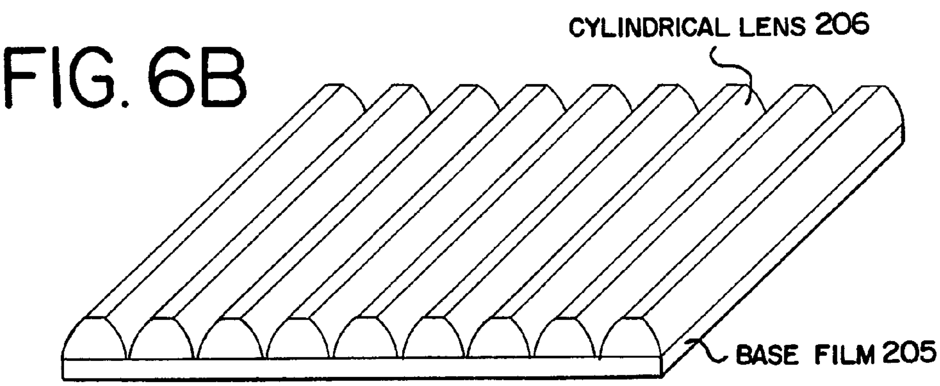
Figure 6C:
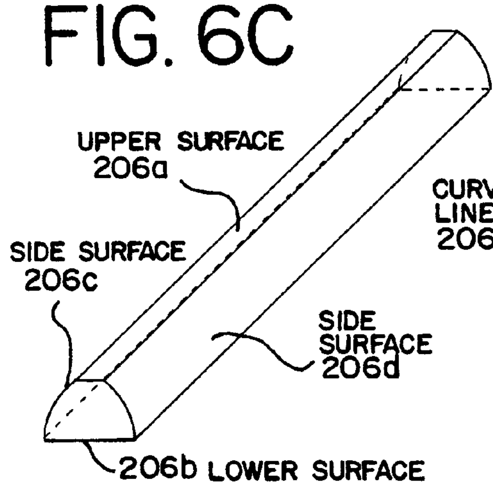

The front light in the present invention has the same configuration as that in Embodiment 1, except for the prism-shaped lenses which are a modified mode of those in Embodiment 1. As shown in FIG. 6A, a light source 202 is disposed on a side surface 201*a* of a light guide plate 201, and a reflector 203 is further provided behind the light source 202. In addition, a collimator sheet 204 is provided so as to come into contact with a lower surface 201*d* of the light guide plate 201. For the purpose of clarification of the descriptions, an upper surface 201*c* of the light guide plate 201 refers to a surface facing a user, while the lower surface 201*d* refers to a surface opposite to the upper surface 201*c*.

The light guide plate 201 is a plate made of rectangular-shaped transparent material in the form of a rectangular parallelepiped with each of four side surfaces thereof being a rectangle in which the shorter edges are significantly shorter as compared to the longer edges. The collimator sheet 204 includes a base film 205 and a plurality of prism-shaped lenses 206 disposed in parallel at regular intervals on the base film 205.

Figure 6D:
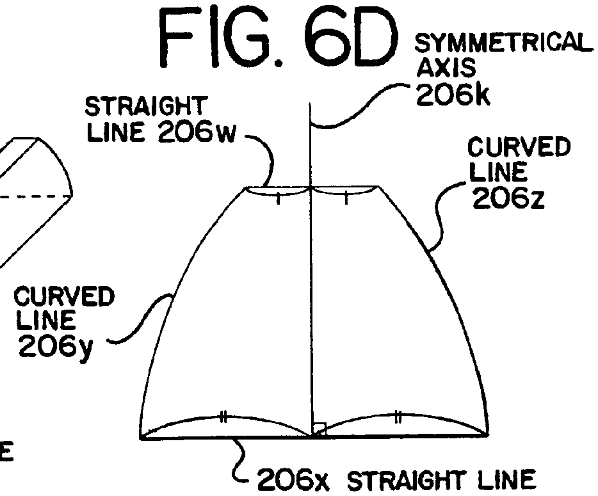

As shown in FIG. 6D, each of the prism-shaped lenses 206 has a cross-section in the shape of a figure enclosed with four edges that corresponds to a figure obtainable by replacing straight edge-sides of the equally-sided trapezoid with curved lines. More specifically, the cross-section is a figure that is enclosed with a pair of opposing parallel straight lines 206*w* and 206*x* and a pair of opposing curved lines 206*y* and 206*z*, and is symmetric with respect to the symmetrical axis 206*k* connecting the middle point of the straight line 206*w* to the middle point of the opposing straight line 206*x*. For the clarification of the descriptions, of four surfaces of each of the prism-shaped lenses 206, a side surface including the straight line 206*w* is referred to as an upper surface 206*a*, while another side surface including the straight line 206*x* is referred to as a lower surface 206*b*. The other side surfaces including the curved lines 206*y* and 206*z*, respectively, are referred to as side surfaces 206*c* and 206*d*, respectively.

In the collimator sheet 204, each of the prism-shaped lenses 206 is disposed so that the lower surface 206*b* thereof is brought into contact with the base film 205. In addition, the collimator sheet 204 is disposed so that the upper surface 206*a* thereof is brought into close contact with the lower surface 201*d* of the light guide plate 201. Although it is not necessary to closely contact the base film 205 and a reflective liquid crystal panel, it is critical that each of the prism-shaped lenses 206 and the light guide plate 201 are in close contact with each other without any other materials interposed therebetween.

Figure 7A:
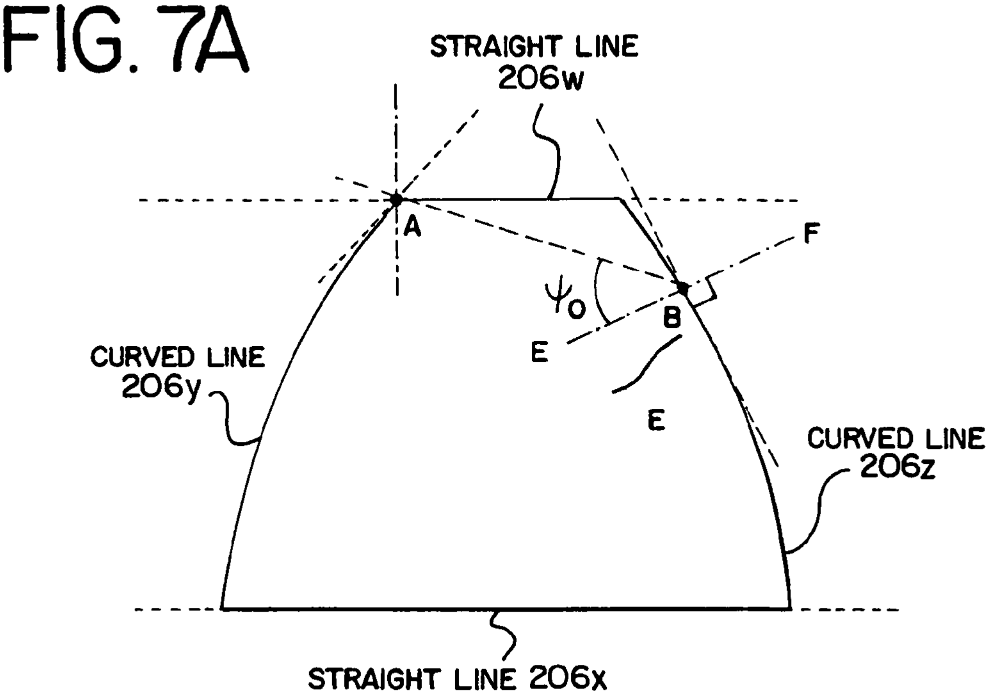
FIGS. 7A and 7B illustrate cross-sectional views of the prism-shaped lenses in accordance with Embodiment 2 of the present invention.
Figure 7B:
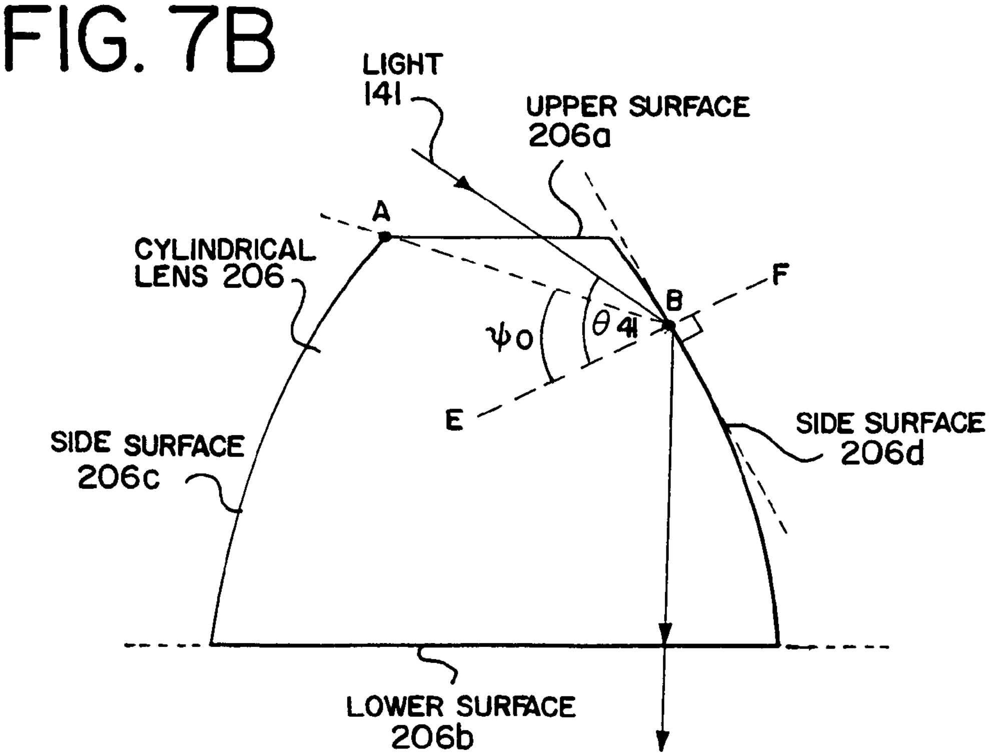

Hereinbelow, the shape of the cross-section of the prism-shaped lenses 206 will be described with reference to FIGS. 7A and 7B. As shown in FIG. 7A, one of the points in the contact portion between the prism-shaped lens 206 and the light guide plate 201 is designated as point A. More specifically, in the cross-section, the crossing point (vertex) at which the straight line 206*w* and the curved line 206*y* intersect with each other is designated as point A. Furthermore, one point arbitrarily selected on the other curved line 206*z* is designated as point B. The curved line 206*z* is drawn so that an angle $\Psi_o$, defined between the straight line AB and the normal line EF at the point B, is set to be equal to the critical angle $\theta_c$ for the total reflection of the prism-shaped lenses 206 with respect to air. More specifically, the curved line 206*z* is drawn by a group of the points B each satisfying the above-mentioned relationship. The curved line 206*y* is drawn by moving the curved line 206*z* to the axially-symmetrical position with respect to the straight line connecting the middle points of the respective opposing straight lines 206*x* and 206*y*.

By providing the prism-shaped lenses 206 with the cross-section as shown in FIG. 7A, the incident angle $\theta_{41}$ of light 141, entering the lens 206 through the upper surface 206*a* thereof, with respect to the side surface 206*d* (206*c*) satisfies the relationship of $\theta_{41}>\Psi_o$. Here, the relationship of $\theta_{41}>\theta_c$ can be obtained due to the relationship of $\Psi_o=\theta_c$. This inequality relationship indicates that all of the light 141 entering each of the lenses 206 through the upper surface 206*a* thereof is incident onto the side surface 206*d* (206*c*) and totally reflected therefrom. In other words, no light transmits through the side surface 206*d* (206*c*), thereby resulting in very high light utilization efficiency. In addition, since the light exits from the prism-shaped lenses 206 after being reflected at the side surface 206*d* (206*c*), a small incident angle onto the reflective liquid crystal panel can be obtained, thereby resulting in increased light utilization efficiency.

The pitch P, the height H, and the width W of the upper surface 206*a* of the prism-shaped lenses 206 in the present embodiment can be set in the same manner as in Embodiment 1. More specifically, the pitch P may be set in the range of 100 to 500 $\mu$m, and both of the height H and the width W may be set in the range of 10 to 50 $\mu$m. In addition, although the angle $\Psi_o$ as shown in FIG. 7A is ideally equal to the critical angle $\theta_c$, it is acceptable that the angle $\Psi_o$ is set in the range of $\theta_c\pm3°$ in view of the margin or the like. For example, in the case where the light guide plate 201 and the prism-shaped lenses 206 are formed of an acrylic resin, it is sufficient for the angle $\Psi_o$ to satisfy the relationship of $39°\leqq\Psi_o\leqq45°$ since the critical angle $\theta_c$ is equal to 42°.

Embodiment 3

Figure 8A:
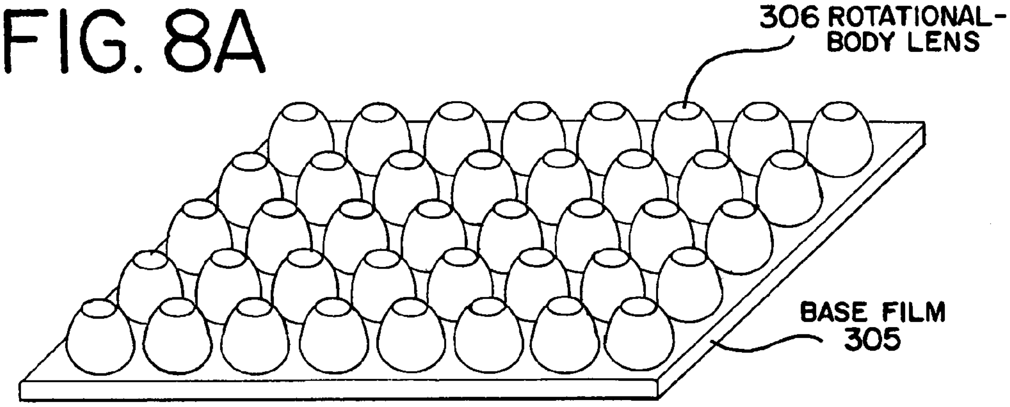
FIGS. 8A and 8B are a perspective view of a collimator sheet in accordance with Embodiment 3 of the present invention and a perspective view of each rotational-body lens in accordance with Embodiment 3 of the present invention, respectively.
Figure 8B:
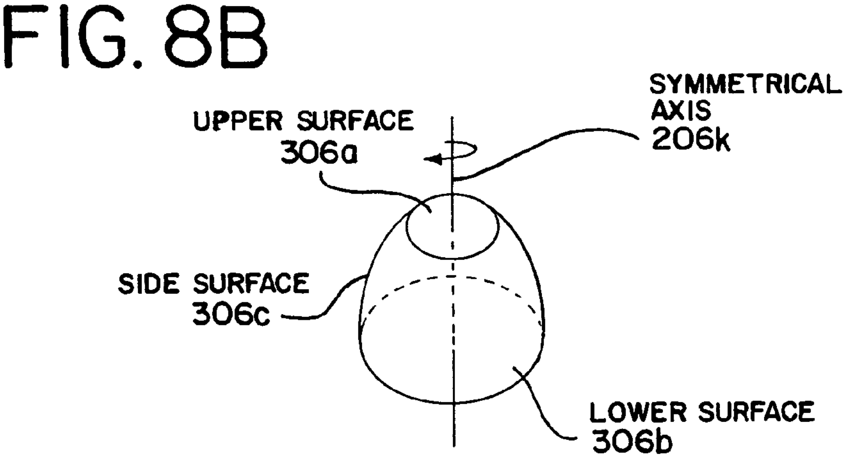

While the prism-shaped lenses are used for the collimator sheet in Embodiments 1 and 2, lenses in the shape of solid of revolution (referred to as the rotational-body lenses in the present specification) are used in the present embodiment. The front light in the present embodiment has the same configuration as that in Embodiment 2, except for the collimator sheet which is a modified mode of that in Embodiment 2. FIGS. 8A and 8B illustrate the configuration of the collimator sheet in the present embodiment.

As shown in FIG. 8A, rotational-body lenses 306 are provided at equal intervals on a base film 305 made of PET so that an upper surface 306*a* of each of the rotational-body lenses 306 is in close contact with a lower surface of a light guide plate (not shown in FIG. 8A). The rotational-body lenses 306 and the light guide plate are made of the same material, of course. As shown in FIG. 8B, each of the rotational-body lenses 306 has a shape obtained by rotating an axially-symmetric figure, as shown in FIG. 6D or FIG. 7A, around the symmetrical axis 206*k*. By providing each of the lenses 306 with the cross-section as shown in FIG. 8B, the light entering the lenses 306 through the upper surface 306*a* thereof is, similar to Embodiment 2, allowed to exit through a lower surface 306*b* after being reflected at a side surface 306*c*.

In the prism-shaped lenses in Embodiments 1 and 2, the light is not allowed to be bent along their longitudinal direction (the direction perpendicular to the drawing sheet of FIGS. 1A and 6A) due to their shapes. On the other hand, by providing each of the lenses 306 with the cross-section in the shape of solid of revolution as in the present embodiment, the light is allowed to be bent also along the direction perpendicular to the longitudinal direction of the collimator sheet. Thus, by optimally arranging the rotational-body lenses 306, more uniform in-plane luminance distribution over the collimator sheet can be obtained.

Embodiment 4

Figure 9:
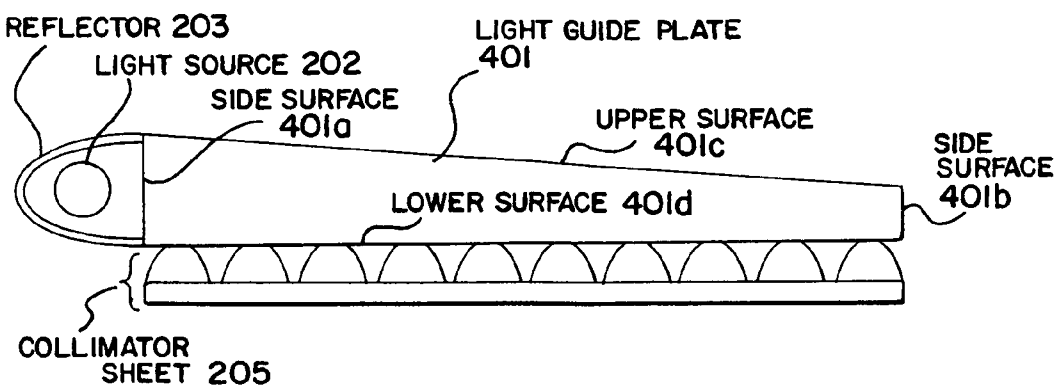
FIG. 9 illustrates a cross-sectional view of a front light in accordance with Embodiment 4 of the present invention.

In the present embodiment, a light guide plate in the front light will be described. While the light guide plates in the previous embodiments are in the plate-shape, FIG. 9 illustrates a cross-sectional view of a front light incorporating therein a wedge-shaped light guide plate. The front light in the present embodiment is a modified mode of that in Embodiment 2. The same components are designated with the same reference symbols both in FIGS. 9 and 6.

In a light guide plate 401, each of opposing side surfaces 401*a* and 401*b* is in the shape of a rectangle, while each of other opposing side surfaces is in the shape of a trapezoid in which non-opposing two angles are right angles. In the case of the wedge-shaped light guide plate 401, light entering therein through a side surface 401*a* is allowed to gradually exit during the propagation in the light guide plate 401 even when the light guide plate 401 is surrounded only with air. This is because the incident angles of light at an upper surface 401*c* and a lower surface 401*d* become gradually smaller while repeating reflections at the upper and lower surfaces 401*c* and 401*d*, so that the total reflection condition is not then satisfied. As a result, the light is allowed to exit through the upper surface 401*c*, and through portions of the lower surface 401*d* which are not in contact with the prism-shaped lenses. This causes disadvantages in which the thus-exited light may travel toward a user, and an incident angle with respect to the prism-shaped lens varies depending on how many times the light has been reflected in the light guide plate 401. Although the use of the wedge-shaped light guide plate 401 is not so desirable because of its disadvantages as described above, it is effective to reduce weight of the light guide plate.

Embodiment 5

Figure 10A:
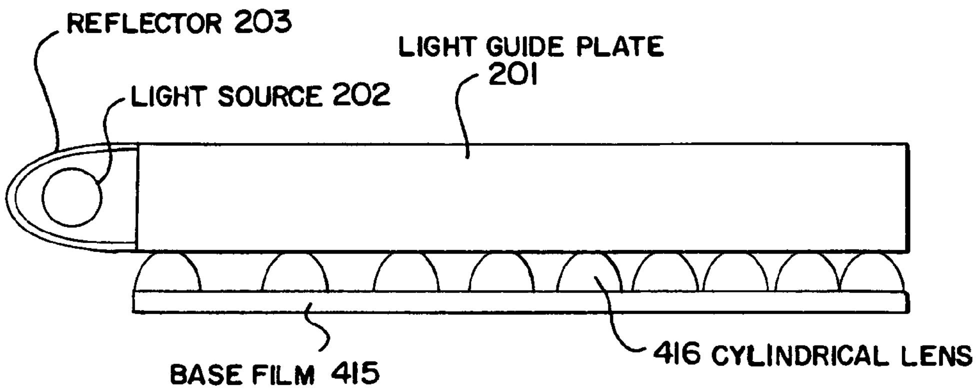
FIGS. 10A and 10B respectively illustrate cross-sectional views of a front light in accordance with Embodiment 5 of the present invention.
Figure 10B:
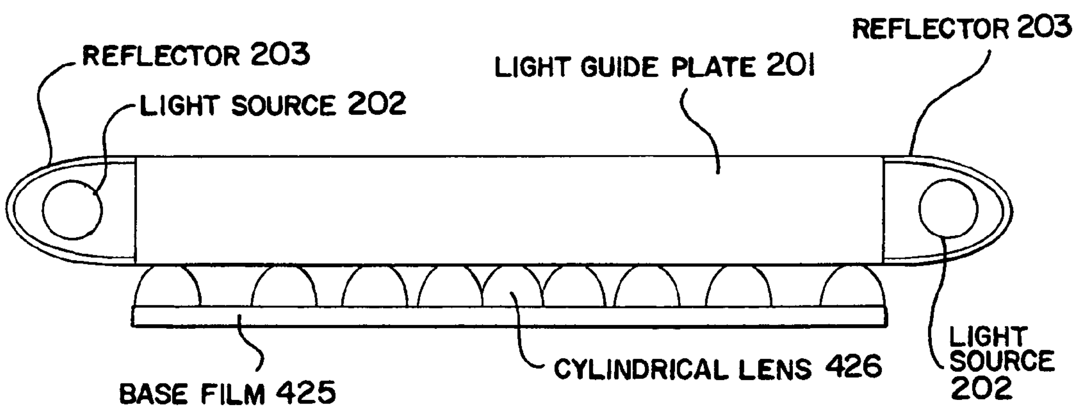

The front light in the present embodiment is a modified mode of that in Embodiment 2. FIGS. 10A and 10B illustrate cross-sectional views of a front light in accordance with the present embodiment. The same components are designated with the same reference symbols in FIGS. 10A, 10B and 6.

When a plurality of prism-shaped lenses 206 are arranged with equal intervals as in Embodiment 2, in-plane luminance distribution may not be uniform so that luminance may become brighter at portions closer to a light source while luminance may become darker at portions away from the light source. In order to obtain uniform in-plane luminance distribution, as shown in FIG. 10A, the prism-shaped lenses 206 can be arranged more densely at portions farther away from the light source 202. FIG. 10B shows another front light, incorporating two light sources 202 therein, in accordance with the present embodiment in which the lenses 206 are arranged at varied intervals. Specifically, the prism-shaped lenses 206 in FIG. 10B are arranged more densely at portions farther away from the light sources 202. Thus, uniform in-plane luminance density can be obtained.

Although Embodiments 4 and 5 have been described as the modified modes of Embodiment 2, the teachings in Embodiments 4 and 5 are of course applicable to Embodiment 1 or 3.

Embodiment 6

In the present embodiment, a base film in a collimator sheet will be described. In the previous embodiments, the base film is made of PET, and is not necessarily required to be in contact with a reflective liquid crystal panel. This is because the planar (i.e., a plate-shaped) base film used in the previous embodiments does not have significant adverse effects optically. However, ideally, the prism-shaped (or rotational-body) lenses and the base film have the same refractive indexes. This is because when the refractive indexes are different, some of light are reflected at the interface between the lens and the base film.

In light of the above, the prism-shaped (or rotational-body) lenses are not necessarily required to be disposed on the base film. Then, the prism-shaped (or rotational-body) lenses may be disposed directly on a member in the top layer in a reflective liquid crystal panel. For example, an optical film, such as a polarizing plate or a phase difference plate, or a touch panel may be provided in the top layer in the reflective liquid crystal panel, and the prism-shaped lenses may be disposed directly thereon.

As described above, the front light in accordance with the present invention is characterized in that, in order to guide the light to a liquid crystal panel, the prism-shaped lenses or the rotational-body lenses are employed to allow the light entering these lenses to be reflected at the side surfaces of the lenses. The resultant reflected light travelling in a different direction is used for illuminating a liquid crystal panel. Thus, the liquid crystal panel can be illuminated from the direction close to the vertical direction with respect to pixel electrodes thereof, and the illuminating light can be utilized efficiently. As a result, in-plane luminance when the light source is on can be improved, which can in turn lead to reduction in power consumption.

Furthermore, the light guide plate is not required to be further processed as in the conventional techniques. Rather, the planar light guide plate is employed, and the prism-shaped (or rotational-body) lenses are separately provided. This enables reduction in production cost. More specifically, in the case where the prism-shaped lenses are to be formed integrally in the light guide plate as in the conventional techniques, the whole body of an expensive light guide plate may have to be discarded if one of produced lenses do not satisfy specified design requirements. On the other hand, in accordance with the present invention, even if one of produced lenses do not satisfy specified design requirements, only the inexpensive prism-shaped (or rotational-body) lenses will be discarded.

Embodiment 7

A front light of the present invention can be used in display portion of various electronic appliances, by combining with a direct-view type reflection type liquid crystal panel. For example, it can be applied to electronic appliances such as a personal computer, a digital camera, a video camera, a portable information terminal (a mobile computer, a mobile telephone, an electronic book, etc.), a navigation system, etc. FIGS. 11A to 11F show electronic appliances which incorporate a reflection type liquid crystal panel with a front light of the present invention.

Figure 11A:
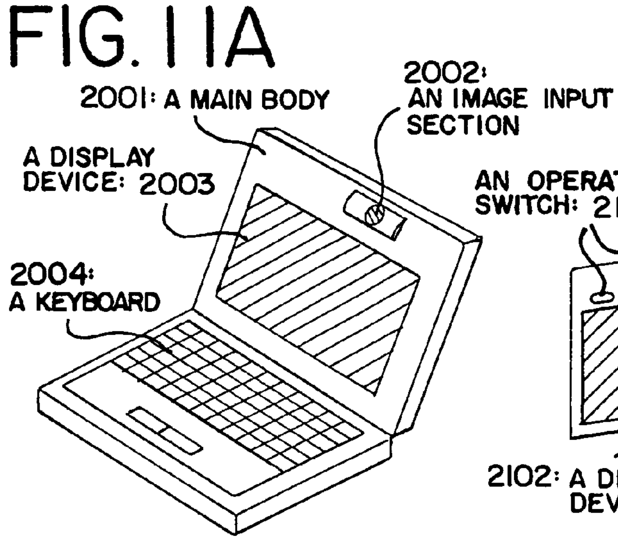
FIGS. 11A to 11F respectively illustrate electronic devices incorporating a front light in accordance with the present invention.

FIG. 11A is a personal computer, which comprises: a main body 2001 incorporating a micro processor, a memory, or the like; an image input section 2002; a display device 2003 using a reflection type liquid crystal panel with a front light; and a key board 2004.

Figure 11B:
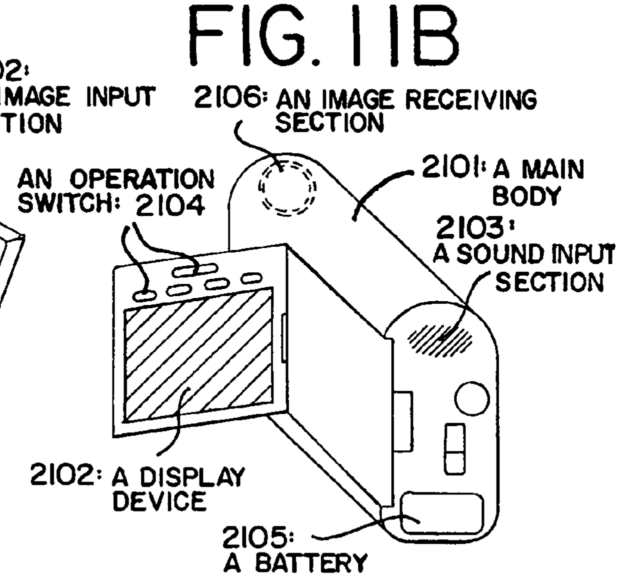

FIG. 11B is a video camera, which comprises: a main body 2101; a display device 2102 using a reflection type liquid crystal display device with a front light; a voice input section 2103; an operation switch 2104; a battery 2105; and an image receiving section 2106. The present invention can be applied to the display device 2102.

Figure 11C:
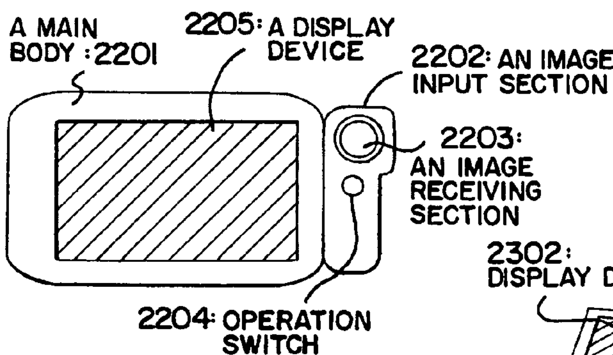

FIG. 11C is a portable information terminal, which comprises: a main body 2201; an image input section 2202; an image receiving section 2203; an operation switch 2204; a display device 2205 using a reflection type liquid crystal panel with a front light.

Figure 11D:
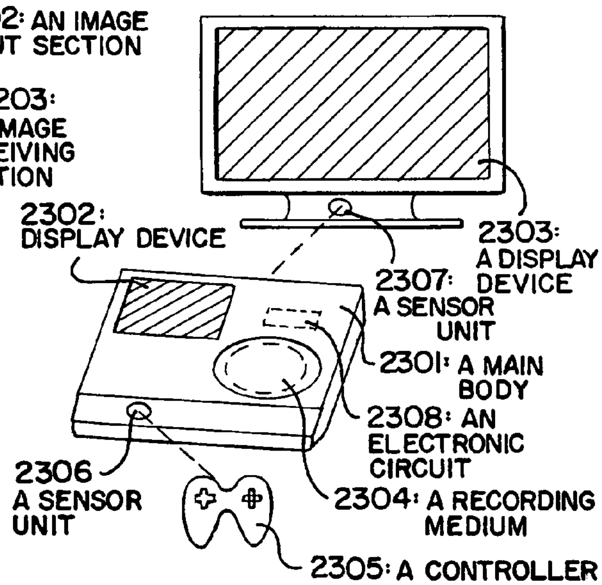

FIG. 11D is an electronic game machine such as a television game or a video game, which comprises: a main body 2301 incorporating an electronic circuit 2308 such as CPU, recording medium 2304, etc.; a controller 2305; a display device 2303; and a reflection type liquid crystal panel display device 2302 with a front light, which is incorporated in the main body 2301. The display device 2303 and the display device 2302 incorporated in the main body 2301 may display the same information, or the former may be used as the main display device, and the latter may be used as a supplementary display device that display the information of the recording medium 2304 or operation conditions of the machine, or alternatively the latter can be used as an operating board by adding function of touch sensor. Further, a wire communication may be used between the main body 2301, the controller 2305 and the display device 2303 in order to mutually transmit signals, or they may use wireless communication or optical communication by providing sensor unit 2306 and 2307.

Figure 11E:
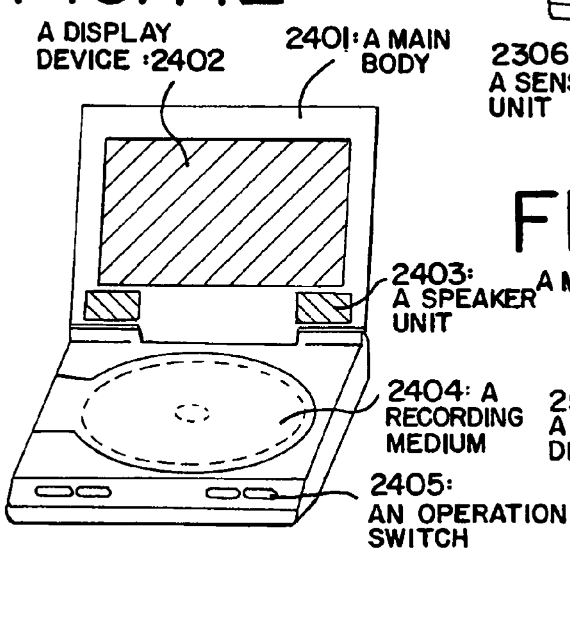

FIG. 11E is a player for reproducing recording medium which records program, image data and audio data (hereinafter referred to as recording medium), which comprises: a main body 2401; a reflection type liquid crystal panel display device 2402 with a front light; a speaker unit 2403; a recording medium 2404; and an operation switch 2405. Note that by using DVD (digital versatile disc) or compact disc (CD), etc., reproduction of music program, image display, video games (or television games), information display through Internet or the like can be performed.

Figure 11F:
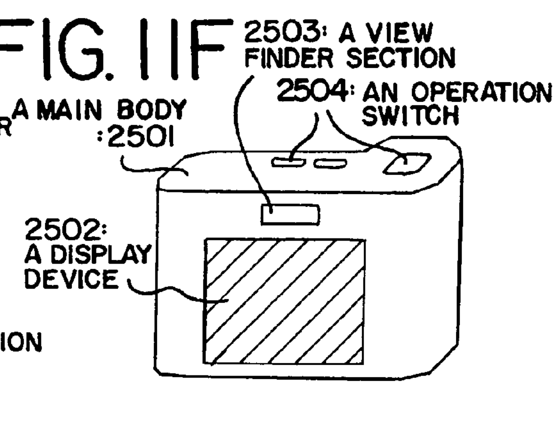

FIG. 11F is a digital camera, which comprises: a main body 2501; a reflection type liquid crystal panel display device 2502 with a front light; a view finder unit 2503; an operation switch 2504; and an image receiving unit (not shown).

Figure 12A:
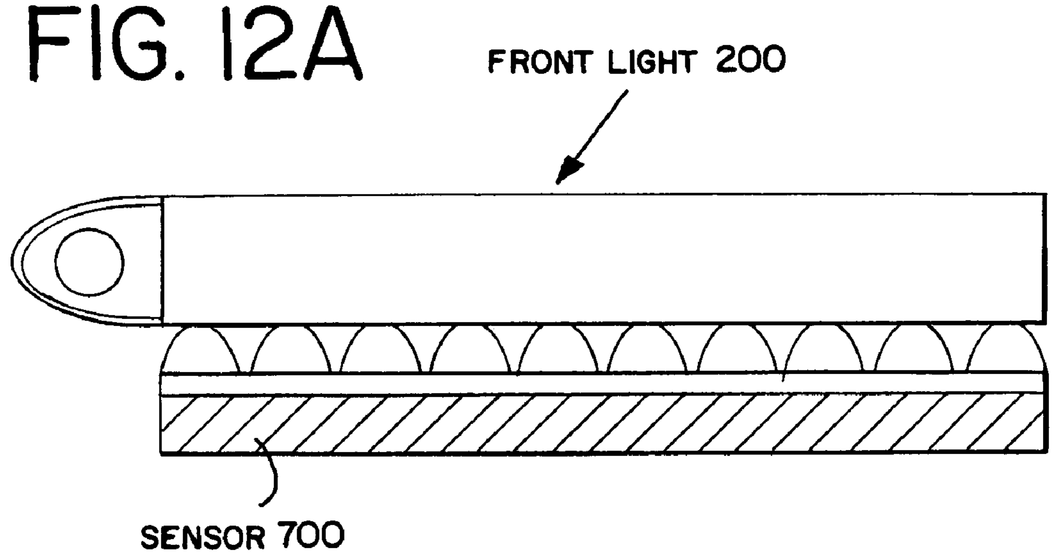
FIGS. 12A and 12B respectively illustrate close-contact type sensor incorporating a front light in accordance with the present invention.
Figure 12B:
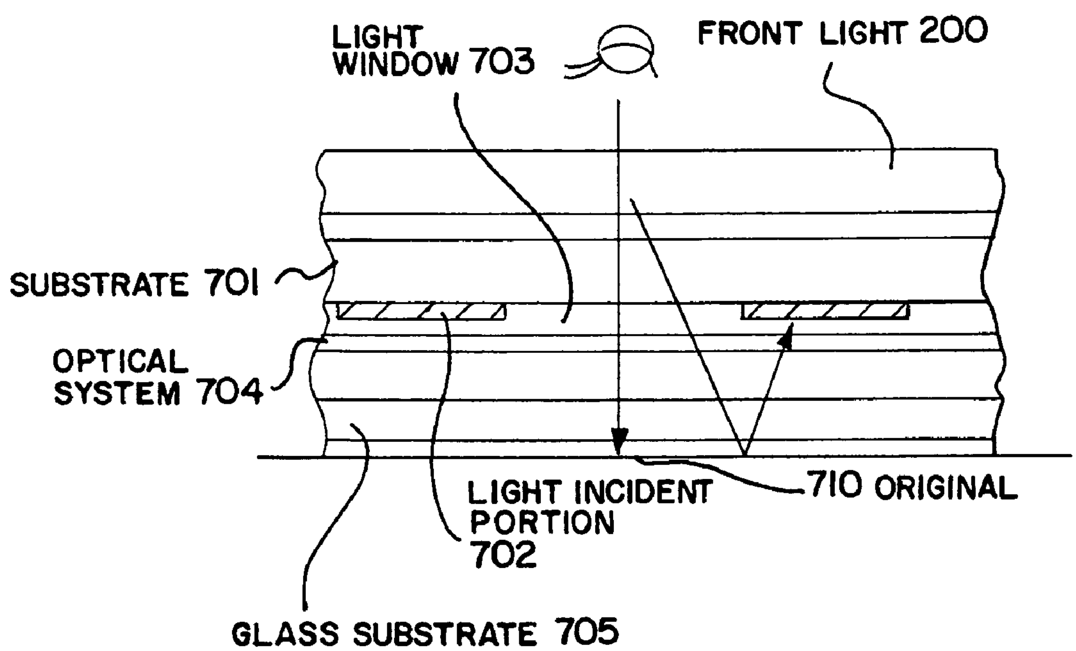
Figure 13A:
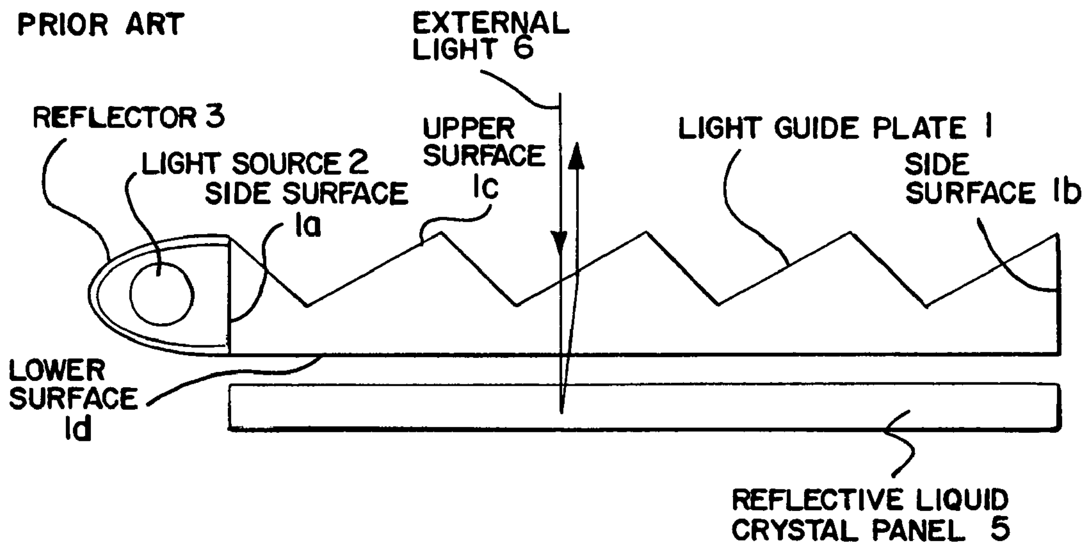
FIGS. 13A and 13B respectively illustrate cross-sectional views of a conventional prism-type front light.
Figure 13B:
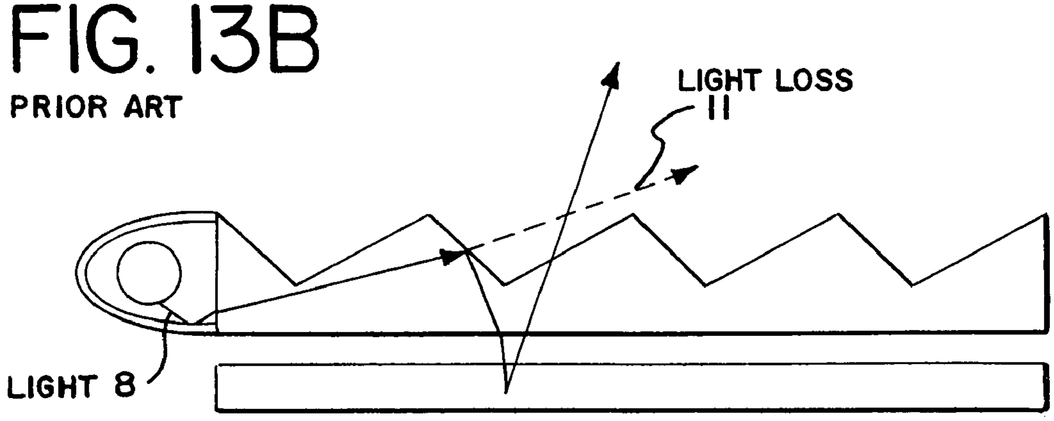
Figure 14A:
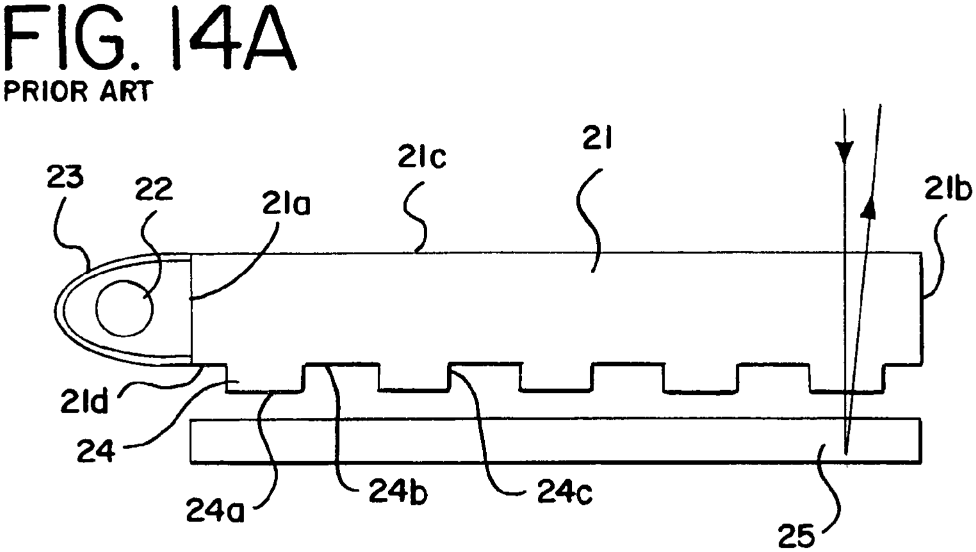
FIGS. 14A and 14B respectively illustrate cross-sectional views of a conventional projection-type front light.
Figure 14B:
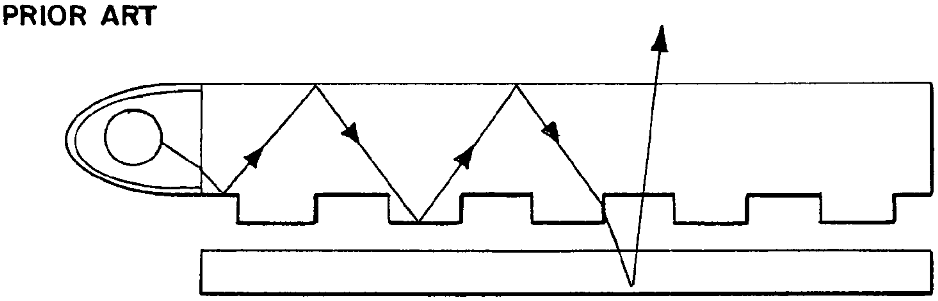
Figure 15:
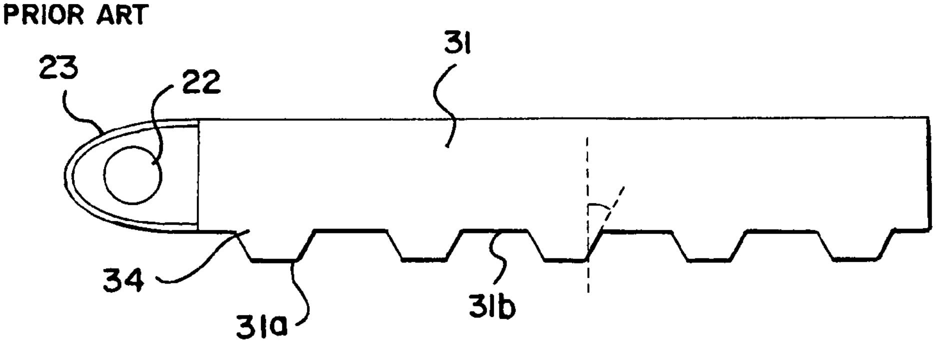
FIG. 15 illustrates a cross-sectional view of a conventional projection-type front light.

Further, the front light of the invention can be used in illumination of other electronic appliances in addition to illumination of reflection type liquid crystal panel, for example, a front light can be applied as a light source for an adhesion type sensor as shown in FIGS. 12A and 12B.

Any constitution of Embodiments 1 to 5 can be used as the front light. In this Embodiment a front light 200 of Embodiment 2 is used. In FIG. 12, the same reference numerals as that of FIG. 6 indicate the same material. FIG. 12A is a cross section in which a sensor 700 is arranged under the front light. The optical system of the adhesive type sensor 700 is not a reduction type system, and it is an equivalent system. In other words, it is a type in which the distance between the manuscript and the sensor is small which is referred to as an adhesive type sensor. The adhesive type sensor of this Embodiment may be a single dimension arrangement (line sensor) or a two dimension arrangement (area sensor).

The construction of the adhesive type sensor and the operation at reading are shown in FIG. 12B. In the adhesive type sensor 700, a light receiving section 702 which performs photoelectric conversion by receiving light, an illumination window 703 for passing through the light, etc., are disposed on the glass substrate 701, under the front light 200. There are cases in which there is no illumination window in case of a line sensor. An equivalent optical system 704 such as a selfoc lens and an optical fiber array are arranged under the light receiving section 702. Note that there are cases that there is no optical system 704. The sensors are called perfect adhesive sensor in such cases.

A manuscript 710 is arranged under the optical system 704 when use. A glass, or the like may be interposed between the manuscript 710 and the optical system 704. The light radiated from the front light injects into the manuscript 710 after passing through the illumination window 703 and the optical system 704. The light reflected by the manuscript injects into the light receiving section 702 by passing through the optical system 704. At this time, the user can observe the manuscript 710 through the front light when the front light 200 of the invention is used. As described above, it is very convenient because they can be used, at the same time with observing the reading sections.

I claim:

1. An electronic device, comprising:

a front light comprising: a light source; a light guide plate; and a plurality of prism-shaped lenses each being in direct contact with a lower surface of the light guide plate, wherein a cross-section of each of the prism-shaped lenses, in a plane perpendicular to the side surfaces thereof, has a shape of equally-sided trapezoid; and a reflective liquid crystal panel under the prism-shaped lenses;

wherein a plane defined by an upper base of the equally-sided trapezoidal cross-section of each of the prism-shaped lenses comes into contact with the lower surface of the light guide plate; and an obtuse angle Φ of the equally-sided trapezoidal cross-section and a critical angle θ for the total reflection of the prism-shaped lenses satisfy the relationship of $90° < \Phi \leqq 90° + \theta$.

2. A front light according to claim 1, wherein a refractive index of each of the prism-shaped lenses is equal to that of the light guide plate.

3. A front light according to claim 1, wherein each of the prism-shaped lenses is made of the same material as the light guide plate.

4. A front light, comprising:

a light source;

a light guide plate; and a plurality of prism-shaped lenses each being in contact with a lower surface of the light guide plate, wherein a cross-section of each of the prism-shaped lenses, in a plane perpendicular to the side surfaces thereof, has a shape of an axially-symmetric figure that is enclosed with a pair of opposing parallel straight lines and a pair of opposing curved lines and is axially symmetric with respect to a straight line connecting middle points of the respective opposing parallel straight lines;

each of the prism-shaped lenses is in contact with the light guide plate in a plane including a shorter one in the pair of opposing parallel straight lines; and in the axially-symmetric figure, an angle defined between a normal at a certain point on one of the opposing curved lines and a straight line connecting a crossing point between the other opposing curved line and the shorter one in the pair of opposing parallel straight lines to the certain point, is in the range of ±3° from a critical angle for the total reflection of each of the prism-shaped lenses.

5. A front light according to claim 4, wherein a refractive index of each of the prism-shaped lenses is equal to that of the light guide plate.

6. A front light according to claim 4, wherein each of the prism-shaped lenses is made of the same material as the light guide plate.

7. A front light, comprising:

a light source;

a light guide plate; and a plurality of rotational-body lenses each being in contact with a lower surface of the light guide plate, wherein each of the rotational-body lenses has a shape of solid of revolution obtained by rotating an axially-symmetric figure, that is enclosed with a pair of opposing parallel straight lines and a pair of opposing curved lines and is axially symmetric with respect to a straight line connecting middle points of the respective opposing parallel straight lines, around said straight line;

in the axially-symmetric figure, an angle defined between a normal at a certain point on one of the opposing curved lines and a straight line connecting a crossing point between the other opposing curved line and a shorter one in the pair of opposing parallel straight lines to the certain point, is in the range of ±3° from a critical angle for the total reflection of each of the rotational-body lenses; and each of the rotational-body lenses is in contact with the light guide plate in a plane including the shorter one in the pair of opposing parallel straight lines.

8. A front light according to claim 7, wherein a refractive index of each of the prism-shaped lenses is equal to that of the light guide plate.

9. A front light according to claim 7, wherein each of the prism-shaped lenses is made of the same material as the light guide plate.

10. An electronic device, comprising:

a reflective liquid crystal panel; and a front light for illuminating the reflective liquid crystal panel, wherein the front light comprises: a light source; a light guide plate; and a plurality of prism-shaped lenses each being in direct contact with a lower surface of the light guide plate, wherein a cross-section of each of the prism-shaped lenses, in a plane perpendicular to the side surfaces thereof, has a shape of equally-sided trapezoid;

a plane defined by an upper base of the equally-sided trapezoidal cross-section of each of the prism-shaped lenses comes into contact with the lower surface of the light guide plate; and an obtuse angle Φ of the equally-sided trapezoidal cross-section and a critical angle θ for the total reflection of the light guide plate satisfy the relationship of $90° < \Phi \leqq 90° + \theta$.

11. An electronic device according to claim 10, wherein a refractive index of each of the prism-shaped lenses is equal to that of the light guide plate.

12. An electronic device according to claim 10, wherein each of the prism-shaped lenses is made of the same material as the light guide plate.

13. An electronic device, comprising:

an optical sensor for reading an object; and a front light for illuminating the object to be read by the optical sensor, wherein the front light comprises: a light source; a light guide plate; and a plurality of prism-shaped lenses each being in contact with a lower surface of the light guide plate, wherein a cross-section of each of the prism-shaped lenses, in a plane perpendicular to the side surfaces thereof, has a shape of equally-sided trapezoid;

a plane defined by an upper base of the equally-sided trapezoidal cross-section of each of the prism-shaped lenses comes into contact with the lower surface of the light guide plate; and an obtuse angle Φ of the equally-sided trapezoidal cross-section and a critical angle θ for the total reflection of the light guide plate the relationship of $90° < \Phi \leqq 90° + \theta$.

14. An electronic device according to claim 13, wherein a refractive index of each of the prism-shaped lenses is equal to that of the light guide plate.

15. An electronic device according to claim 13, wherein each of the prism-shaped lenses is made of the same material as the light guide plate.

16. An electronic device, comprising:

a liquid crystal panel; and a front light for illuminating the liquid crystal panel from a display screen side thereof, wherein the front light comprises: a light source; a light guide plate; and a plurality of prism-shaped lenses each being in contact with a lower surface of the light guide plate, wherein a cross-section of each of the prism-shaped lenses, in a plane perpendicular to the side surfaces thereof, has a shape of an axially-symmetric figure that is enclosed with a pair of opposing parallel straight lines and a pair of opposing curved lines and is axially symmetric with respect to a straight line connecting middle points of the respective opposing parallel straight lines;

each of the prism-shaped lenses is in contact with the light guide plate in a plane including a shorter one in the pair of opposing parallel straight lines; and in the axially-symmetric figure, an angle defined between a normal at a certain point on one of the opposing curved lines and a straight line connecting a crossing point between the other opposing curved line and the shorter one in the pair of opposing parallel straight lines to the certain point, is in the range of ±3° from a critical angle for the total reflection of each of the prism-shaped lenses.

17. An electronic device according to claim 16, wherein a refractive index of each of the prism-shaped lenses is equal to that of the light guide plate.

18. An electronic device according to claim 16, wherein each of the prism-shaped lenses is made of the same material as the light guide plate.

19. An electronic device, comprising:

an optical sensor; and a front light for illuminating an object to be read by the optical sensor, wherein the front light comprises: a light source; a light guide plate; and a plurality of prism-shaped lenses each being in contact with a lower surface of the light guide plate, wherein a cross-section of each of the prism-shaped lenses, in a plane perpendicular to the side surfaces thereof, has a shape of an axially-symmetric figure that is enclosed with a pair of opposing parallel straight lines and a pair of opposing curved lines and is axially symmetric with respect to a straight line connecting middle points of the respective opposing parallel straight lines;

each of the prism-shaped lenses is in contact with the light guide plate in a plane including a shorter one in the pair of opposing parallel straight lines; and in the axially-symmetric figure, an angle defined between a normal at a certain point on one of the opposing curved lines and a straight line connecting a crossing point between the other opposing curved line and the shorter one in the pair of opposing parallel straight lines to the certain point, is in the range of ±3° from a critical angle for the total reflection of each of the prism-shaped lenses.

20. An electronic device according to claim 19, wherein a refractive index of each of the prism-shaped lenses is equal to that of the light guide plate.

21. An electronic device according to claim 19, wherein each of the prism-shaped lenses is made of the same material as the light guide plate.

22. An electronic device, comprising:

an optical sensor; and a front light for illuminating an object to be read by the optical sensor, wherein the front light comprises: a light source; a light guide plate; and a plurality of rotational-body lenses each being in contact with a lower surface of the light guide plate, wherein each of the rotational-body lenses has a shape of solid of revolution obtained by rotating an axially-symmetric figure, that is enclosed with a pair of opposing parallel straight lines and a pair of opposing curved lines and is axially symmetric with respect to a straight line connecting middle points of the respective opposing parallel straight lines, around said straight line;

each of the rotational-body lenses is in contact with the light guide plate in a plane including a shorter one in the pair of opposing parallel straight lines; and in the axially-symmetric figure, an angle defined between a normal at a certain point on one of the opposing curved lines and a straight line connecting a crossing point between the other opposing curved line and the shorter one in the pair of opposing parallel straight lines to the certain point, is in the range of ±3° from a critical angle for the total reflection of each of the rotational-body lenses.

23. An electronic device according to claim 22, wherein a refractive index of each of the rotational-body lenses is equal to that of the light guide plate.

24. An electronic device according to claim 22, wherein each of the rotational-body lenses is made of the same material as the light guide plate.

25. An electronic device, comprising:

a liquid crystal panel; and a front light for illuminating the liquid crystal panel from a side of a display screen thereof, wherein the front light comprises: a light source; a light guide plate; and a plurality of rotational-body lenses each being in contact with a lower surface of the light guide plate, wherein each of the rotational-body lenses has a shape of solid of revolution obtained by rotating an axially-symmetric figure, that is enclosed with a pair of opposing parallel straight lines and a pair of opposing curved lines and is axially symmetric with respect to a straight line connecting middle points of the respective opposing parallel straight lines, around said straight line;

each of the rotational-body lenses is in contact with the light guide plate in a plane including a shorter one in the pair of opposing parallel straight lines; and in the axially-symmetric figure, an angle defined between a normal at a certain point on one of the opposing curved lines and a straight line connecting a crossing point between the other opposing curved line and the shorter one in the pair of opposing parallel straight lines to the certain point, is in the range of ±3° from a critical angle for the total reflection of each of the rotational-body lenses.

26. An electronic device according to claim 25, wherein each of the rotational-body lenses is made of the same material as the light guide plate.

27. An electronic device according to claim 25, wherein a refractive index of each of the rotational-body lenses is equal to that of the light guide plate.

* * * * *